(12) United States Patent
Yamaguchi

(10) Patent No.: US 11,087,288 B2
(45) Date of Patent: Aug. 10, 2021

(54) VACANT TIME SLOT MANAGING DEVICE, VACANT TIME SLOT MANAGING METHOD, COMPUTER PROGRAM, AND STORAGE MEDIUM

(71) Applicant: BLUE MARLIN PARTNERS, INC., Tokyo (JP)

(72) Inventor: Yohei Yamaguchi, Tokyo (JP)

(73) Assignee: BLUE MARLIN PARTNERS, INC., Tokyo (JP)

( * ) Notice: Subject to any disclaimer, the term of this patent is extended or adjusted under 35 U.S.C. 154(b) by 712 days.

(21) Appl. No.: 15/575,773

(22) PCT Filed: May 20, 2016

(86) PCT No.: PCT/JP2016/065055
§ 371 (c)(1),
(2) Date: Nov. 20, 2017

(87) PCT Pub. No.: WO2016/186205
PCT Pub. Date: Nov. 24, 2016

(65) Prior Publication Data
US 2018/0121882 A1    May 3, 2018

(30) Foreign Application Priority Data
May 21, 2015    (JP) .............................. JP2015-103517

(51) Int. Cl.
*G06Q 10/00* (2012.01)
*G06F 16/22* (2019.01)
*G06Q 10/10* (2012.01)

(52) U.S. Cl.
CPC ......... *G06Q 10/1095* (2013.01); *G06F 16/22* (2019.01); *G06Q 10/109* (2013.01)

(58) Field of Classification Search
CPC ..................................................... G06Q 10/10
See application file for complete search history.

(56) References Cited

U.S. PATENT DOCUMENTS 6,640,230 B1 * 10/2003 Alexander ........... G06Q 10/107
8,301,636 B2    10/2012 Stillion et al.
(Continued)

FOREIGN PATENT DOCUMENTS

JP    H10-207944 A    8/1998
JP    2000-090165 A    3/2000
(Continued)

OTHER PUBLICATIONS

Gauthier, Operating Room Management Under Uncertainty, 2015, Springer Science + Business Media, 21577-596 (Year: 2015).*
(Continued)

*Primary Examiner* — Hafiz A Kassim
*Assistant Examiner* — Zahra Elkassabgi
(74) *Attorney, Agent, or Firm* — Studebaker & Brackett PC

(57) ABSTRACT

A vacant time slot managing device (1) includes a control section (3), a schedule acquiring section (5), a vacant time slot computing section (7), and storage (17). The control section (3) causes the storage (17) to store vacant time slot data representing a vacant time slot of a user. The schedule acquiring section (5) acquires time data from scheduled event list data that includes the time data. The schedule time represents a start time and an end time of a scheduled event of the user. The vacant time slot computing section (7) computes the vacant time slot based on the schedule time data.

20 Claims, 11 Drawing Sheets

(56) References Cited

U.S. PATENT DOCUMENTS

| | | | | |
|---|---|---|---|---|
| 2004/0093290 A1* | 5/2004 | Doss | ............... | G06Q 10/1095 705/35 |
| 2007/0143684 A1 | 6/2007 | Stillion et al. | | |
| 2010/0174998 A1* | 7/2010 | Lazarus | ............... | G06Q 10/109 715/751 |
| 2014/0179354 A1* | 6/2014 | Fisher | ............... | H04W 4/02 455/456.3 |
| 2016/0342952 A1* | 11/2016 | Yasuda | ............... | G06Q 10/1095 |
| 2017/0169397 A1* | 6/2017 | Castelli | ............... | G06Q 10/1095 |

FOREIGN PATENT DOCUMENTS

| | | |
|---|---|---|
| JP | 2002-149879 A | 5/2002 |
| JP | 2002-304499 A | 10/2002 |
| JP | 2003-168015 A | 6/2003 |
| JP | 2006-318311 A | 11/2006 |
| JP | 2009-520274 A | 5/2009 |
| JP | 2009-217397 A | 9/2009 |
| JP | 2013-168003 A | 8/2013 |
| JP | 2013-171576 A | 9/2013 |
| JP | 2014-119990 A | 6/2014 |
| JP | 2014-179056 A | 9/2014 |

OTHER PUBLICATIONS

An Office Action mailed by the Japanese Patent Office dated Jan. 5, 2021, which corresponds to Japanese Patent Application No. 2016-178691 and is related to U.S. Appl. No. 15/575,773; with English language translation.

International Search Report issued in PCT/JP2016/065055; dated Jul. 26, 2016.

"Office2000 Shinkino Check, Korede Wakatta!"; Microsoft Office 2000; May 1, 1999; pp. 91-100; ISBN 4-89100-074-0.

* cited by examiner

VACANT TIME SLOT MANAGING DEVICE, VACANT TIME SLOT MANAGING METHOD, COMPUTER PROGRAM, AND STORAGE MEDIUM

TECHNICAL FIELD

The present invention relates to a vacant time slot managing device, a vacant time slot managing method, a computer program, and a storage medium.

BACKGROUND ART

A calendar display device disclosed in Patent Literature 1 presents a scheduled event in a calendar to which image-associated schedule information is added.

CITATION LIST

Patent Literature

[Patent Literature 1] Japanese Patent Application Laid-Open Publication No. 2014-179056

SUMMARY OF INVENTION

Technical Problem

However, a user can only manage the scheduled event and cannot manage free time using the calendar display device disclosed in Patent Literature 1.

The present invention has been made in view of the foregoing and has its object of providing a vacant time slot managing device, a vacant time slot managing method, a computer program, and a storage medium that each can manage user's free time.

Solution to Problem

According to a first aspect of the present invention, a vacant time slot management device includes storage and a control section that causes the storage to store vacant time slot data representing a vacant time slot of a user.

Preferably, the vacant time slot managing device according to the present invention further includes a schedule acquiring section and a vacant time slot computing section. The schedule acquiring section preferably acquires time data representing a start time and an end time of a scheduled event of the user from scheduled event list data that includes the time data. The vacant time slot computing section preferably computes the vacant time slot based on the time data.

In the vacant time slot managing device according to the present invention, the control section preferably causes the storage to store a condition for which a time slot is acceptable for being stored in the storage as the vacant time slot. The vacant time slot time computing section preferably computes the vacant time slot under the condition.

In the vacant time slot managing device according to the present invention, the vacant time slot computing section preferably computes the vacant time slot within a specific range on a time axis based on the time data.

In the vacant time slot managing device according to the present invention, the vacant time slot computing section preferably computes the vacant time slot such that the vacant time slot does not include at least one of a period from a time point a first specific period before the start time of the scheduled event to the start time and a period from the end time of the scheduled event to a time point a second specific period after the end time.

In the vacant time slot managing device according to the present invention, the vacant time slot computing section preferably computes the vacant time slot such that the vacant time slot is longer than a third specific period.

Preferably, the vacant time slot managing device according to the present invention further includes an interface section. The interface section receives the vacant time slot data from a user terminal.

In the vacant time slot managing device according to the present invention, the vacant time slot computing section preferably reads out the vacant time slot data from the storage and generates a calendar to which the vacant time slot is input.

Preferably, the vacant time slot managing device according to the present invention further includes a character string generating section configured to generate a character string for disclosing the vacant time slot of the user.

In the vacant time slot managing device according to the present invention, the user is a plurality of users and the control section preferably causes the storage to store the vacant time slot data on a user by user basis. Preferably, the vacant time slot managing device further includes a vacant time slot comparing section. The vacant time slot comparing section performs comparison among vacant time slots of the respective users.

In the vacant time slot managing device according to the present invention, the vacant time slot managing device preferably transmits to user terminal information indicating a candidate for a scheduled event to be input to the vacant time slot in correlation with the vacant time slot.

According to a second aspect of the present invention, a vacant time slot managing method includes storing to storage vacant time slot data representing a vacant time slot of a user, and reading out the vacant time slot data from the storage.

According to a third aspect of the present invention, a computer program causes a computer to store to storage vacant time slot data representing a vacant time slot of a user, and read out the vacant time slot data from the storage.

According to a fourth aspect of the present invention, a non-transitory computer readable storage medium stores a computer program therein. The computer program causes a computer to store to storage vacant time slot data representing a vacant time slot of a user, and read out the vacant time slot data from the storage.

Advantageous Effects of Invention

According to the present invention, user's free time can be managed.

DESCRIPTION OF EMBODIMENTS

Figure 1:
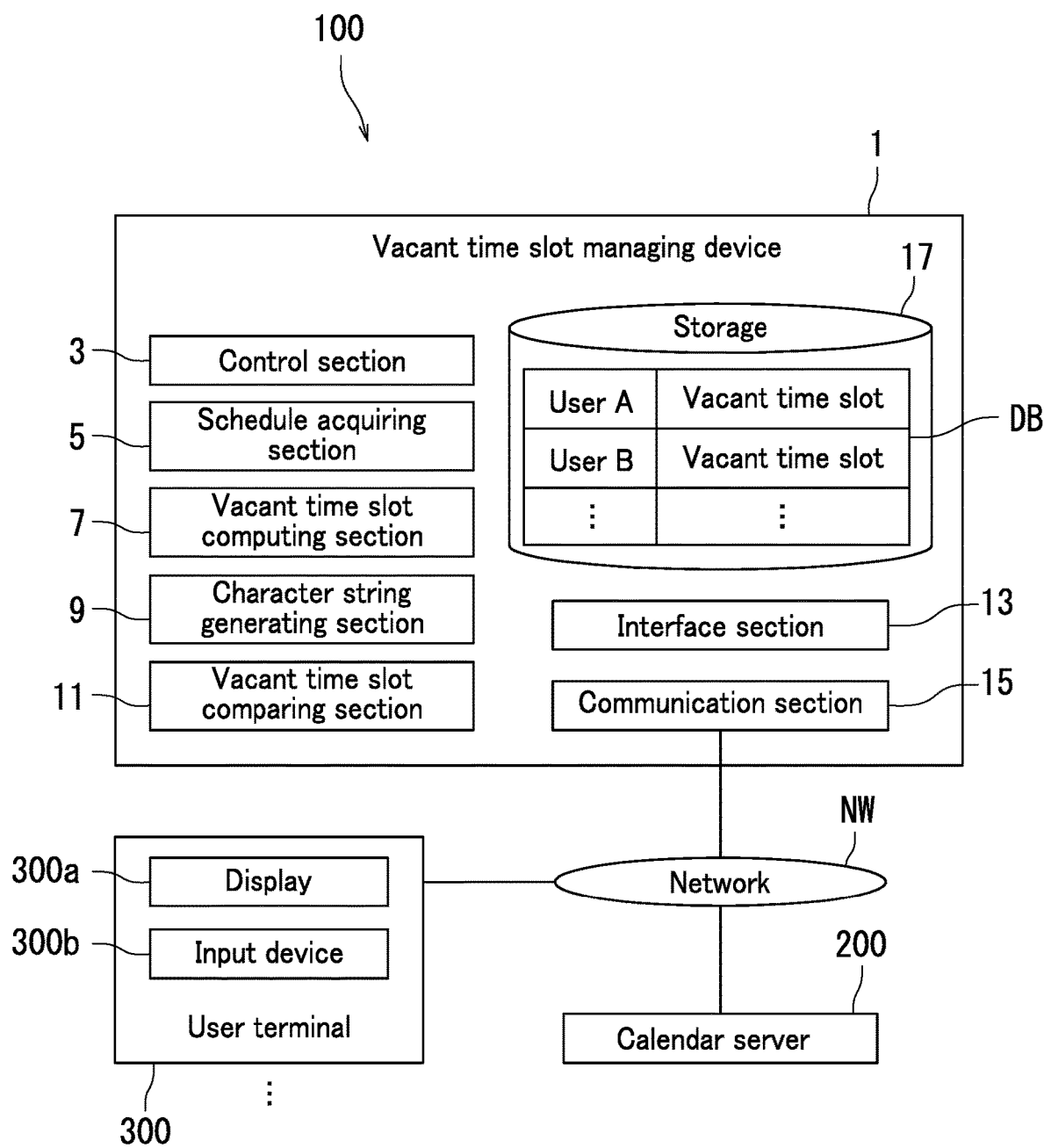
FIG. 1 is a functional block diagram illustrating a vacant time slot managing device according to an embodiment of the present invention.

The following describes an embodiment of the present invention with reference to drawings. Elements that are the same or equivalent are marked using the same reference signs in the drawings and explanation thereof is not repeated.

FIG. 1 is a functional block diagram illustrating a vacant time slot managing device 1 according to the embodiment of the present invention. As illustrated in FIG. 1, the vacant time slot managing device 1 is included in a vacant time slot managing system 100.

The vacant time slot managing device 1 includes a control section 3, a schedule acquiring section 5, a vacant time slot computing section 7, a character string generating section 9, a vacant time slot comparing section 11, an interface section 13, a communication section 15, and storage 17.

The control section 3 controls the schedule acquiring section 5, the vacant time slot computing section 7, the character string generating section 9, the vacant time slot comparing section 11, the interface section 13, the communication section 15, and the storage 17.

The control section 3 causes the storage 17 to store vacant time slot data each representing a vacant time slot of a user in correlation with date data representing day, month, and year (including day of week) to build a database DB in the storage 17. The vacant time slot data is stored on a user by user basis. The vacant time slots include a vacant time slot computed by the vacant time slot managing device 1 and a vacant time slot input by a user.

The database DB is correlated with user data, the date data, and the vacant time slot data of the respective users and built on a user by user basis. The user data includes for example identification information, a title or name, an address or residence, a communication address, and a profile of a user. The communication address refers to for example a telephone number, a mail address, or account information issued by various websites. The websites each are for example a site providing a social networking service (also referred to below as "SNS").

According to the present embodiment, vacant time slots of a user can be managed using the vacant time slot managing device 1. Utilization of user's free time can be accordingly supported.

For example, provision of a vacant time slot of a user by the user to a third person (including another user in the present description) with or without charge can be supported. For example, utilization of a vacant time slot of the user by the third person with or without charge can be supported by allowing the third person to search information on the vacant time slot of the user. For example, presentation of the information on the vacant time slots of the user to the third person by the user can be supported. For example, the user can easily manage the vacant time slots of the user's own through visualization of the information on the vacant time slots of the user. For example, a plurality of users can share information on vacant time slots of the respective users. For example, an added value can be added to a vacant time slot of each of the users through correlation of the vacant time slot of the user with at least one items (for example, at least one of skill, educational background, business carrier, place, and labor cost), thereby increasing a utility value of users' free time.

Description of the vacant time slot managing system 100 will be continued with reference to FIG. 1. The vacant time slot managing system 100 further includes a calendar server 200, a plurality of user terminals 300, and a network NW.

The network NW includes for example Internet, a local area network (LAN), and a public telephone network. The vacant time slot managing device 1, the calendar server 200, and the user terminals 300 are connected to the network NW. In the above configuration, the vacant time slot managing device 1, the calendar server 200, and the user terminals 300 are communicable with one another via the network NW. Specifically, the communication section 15 of the vacant time slot managing device 1 is connected to the network NW to communicate with the calendar server 200 and the user terminals 300.

Each of the user terminals 300 includes a display 300a and an input device 300b. The user terminal 300 is for example a desktop personal computer, a notebook personal computer, a tablet computer, or a smartphone. The input device 300b is for example a touch panel or a set of a pointing device and a keyboard.

The calendar server 200 stores therein calendar data. The calendar data is an example of scheduled event list data. The calendar data is prepared for each user and includes scheduled event data representing contents of a scheduled event of a user, time data representing a start time and an end time of the scheduled event of the user (also referred to below as "schedule time data"), and data representing a calendar. The start time and the end time of the scheduled event are also referred collectively to a "schedule time". A time period from the start time to the end time of the scheduled event is also referred to as a "schedule period". The calendar is an example of a scheduled event list.

The calendar server 200 provides via the network NW a calendar based on calendar data corresponding to a login identification (ID) and a login password to a user terminal 300 that has logged in. The calendar includes contents and a schedule time of a scheduled event of a user who possesses the login ID and the login password. The calendar server 200 updates the calendar data according to input data transmitted from the user terminal 300. In the above configuration, the user is allowed not only to browse the calendar but also to input contents and a schedule time of a scheduled event to the calendar and change or delete the contents and the schedule time of the scheduled event input to the calendar through operation of the user terminal 300.

Description of the vacant time slot managing device 1 will be continued with reference to FIG. 1.

Computation of a vacant time slot performed by the vacant time slot managing device 1 will be described first. The schedule acquiring section 5 acquires the calendar data from the calendar server 200. The schedule acquiring section 5 acquires at least schedule time data of a user from the calendar data stored in the calendar server 200 in the present embodiment. The schedule time data includes data representing day of week, day, month, and year.

Specifically, the schedule acquiring section 5 transmits a request to transmit the schedule time data to the calendar server 200 via the communication section 15. The calendar server 200 transmits the schedule time data to the vacant time slot managing device 1 in response to the request. The communication section 15 receives the schedule time data. The schedule acquiring section 5 then acquires the schedule time data from the communication section 15. The vacant time slot computing section 7 computes a vacant time slot of the user based on the schedule time data of the user. In the above configuration in the present embodiment, a vacant time slot is automatically computed, thereby reducing user's labor for inputting a vacant time slot.

Specifically, the control section 3 causes the storage 17 to store a condition for which a time slot is acceptable for being stored in the storage 17 as a vacant time slot (also referred to below as a "constraint condition").

The vacant time slot computing section 7 computes a vacant time slot of the user based on the schedule time data of the user under the constraint condition. In the above configuration in the present embodiment, when the user causes the storage 17 to store a constraint condition in which contents according to user's desire are set, a vacant time slot suitable for user's lifestyle can be computed by the vacant time slot computing section 7.

For example, the vacant time slot computing section 7 computes a vacant time slot within a specific range on a time axis (also referred to below as a "vacant time slot setting acceptable range" based on the schedule time data of the user. The vacant time slot setting acceptable range is a range on the time axis within which storage of a time slot in the storage 17 as a vacant time slot is acceptable. In the above configuration in the present embodiment, the user can cause the vacant time slot computing section 7 to compute a vacant time slot in a desired time zone. For example, the user can cause the vacant time slot computing section 7 to compute a vacant time slot in an active time zone except a sleeping time zone.

For example, the vacant time slot computing section 7 does not compute a vacant time slot within a range not included in the vacant time slot setting acceptable range on the time axis (also referred to below as a "vacant time slot setting unacceptable range". The vacant time slot setting unacceptable range is a range on the time axis within which storage of a time slot in the storage 17 as a vacant time slot is unacceptable. In the above configuration in the present embodiment, the vacant time slot computing section 7 can be prevented from computing a vacant time slot in a user-intended time zone. For example, computation of a vacant time slot in a user's day off such Sundays by the vacant time slot computing section 7 can be prevented.

For example, the vacant time slot computing section 7 computes a vacant time slot such that the vacant time slot does not include a period "from a time point a first specific period FT before a start time of a scheduled event of the user to the start time" and a period "from an end time of the scheduled event to a time point a second specific period ST after to the end time". In the above configuration in the present embodiment, no vacant time slot is computed in a period immediately before the scheduled event. As a result, a situation in which smooth user performance of the scheduled event is hindered by utilization of free time can be prevented.

For example, free time immediately before a scheduled event is not utilized and accordingly a situation in which the user cannot reach a scheduled place or finish preparation for the scheduled event by scheduled time can be prevented. Furthermore, no vacant time slot is computed in a period immediately after the scheduled event in the present embodiment. As a result, a situation in which smooth utilization of the vacant time slots is hindered by execution of the scheduled event can be prevented. For example, a grace period immediately after the scheduled event until utilization of free time is enabled can be esured. Therefore, a situation in which the user cannot reach a destination or finish preparation for utilization of free time till a time point from which the free time is utilized can be prevented.

For example, the vacant time slot computing section 7 computes a vacant time slot such that the vacant time slot is longer than a third specific period TT. In the above configuration in the present embodiment, a situation in which a too short vacant time slot is set can be prevented, thereby achieving effective free time utilization. Effective utilization may be impossible for example in ten-minute vacant time slot. By contrast, when at least one hour is secured as a vacant time slot, effective utilization of the vacant time slot can be possible.

The vacant time slot setting acceptable range, the vacant time slot setting unacceptable range, the first, second, and third specific periods FT, ST, and TT each are an example of the constraint condition. In the present embodiment, the vacant time slot setting acceptable range is defined by the start time and the end time of a vacant time slot setting acceptable range. The vacant time slot setting unacceptable range is defined by a day of week.

The user sets the constraint conditions such as above to the vacant time slot managing device 1 through the user terminal 300 of the user and the network NW. That is, the interface section 13 receives data representing the vacant time slot setting acceptable range, data representing the vacant time slot setting unacceptable range, data representing the first specific period FT, data representing the second specific period ST, and data representing the third specific period TT from the user terminal 300 via the communication section 15. The data representing the vacant time slot setting acceptable range includes data representing a start time of the vacant time slot setting acceptable range and data representing an end time of the vacant time slot setting acceptable range. The data representing the vacant time slot setting unacceptable range includes data representing a day of week. According to present embodiment, the user can set the constraint conditions to have desired contents.

The control section 3 causes the storage 17 to store the data representing the vacant time slot setting acceptable range, the data representing the vacant time slot setting unacceptable range, the data representing the first specific period FT, the data representing the second specific period ST, and the data representing the third specific period TT as the constraint conditions.

User input of a vacant time slot will be described next. The interface section 13 receives from the user terminal 300 via the communication section 15 vacant time slot data representing a vacant time slot that the user inputs to the user terminal 300. The control section 3 then updates the vacant time slot data stored in the storage 17 based on the vacant time slot data received by the interface section 13. In the above configuration in present embodiment, the user can manually input a vacant time slot as desired. As a result, user convenience can be improved. For example, the user can change and delete the vacant time slot and add a vacant time slot.

Figure 2:
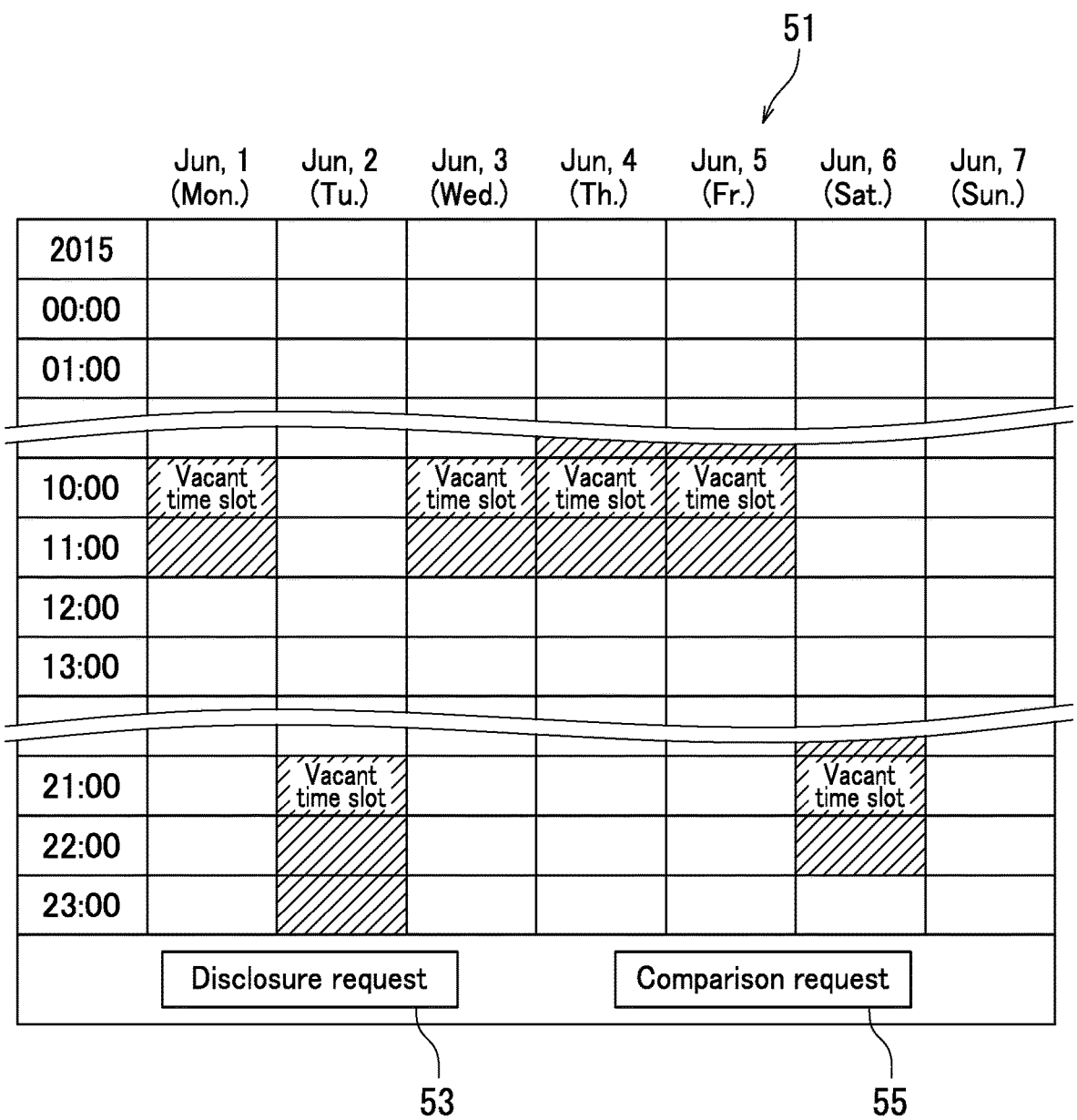
FIG. 2 is a diagram illustrating a vacant time slot calendar presented by the vacant time slot managing device according to the embodiment of the present invention.

A vacant time slot calendar 51 that the vacant time slot computing section 7 generates will be described next with reference to FIGS. 1 and 2. FIG. 2 is a diagram illustrating the vacant time slot calendar 51. As illustrated in FIGS. 1 and 2, the vacant time slot computing section 7 reads out the vacant time slot data from the storage 17 on a user by user basis, generates a vacant time slot calendar 51, and puts the generated vacant time slot calendar 51 on the network NW. The vacant time slot calendar 51 is a calendar that includes time, day, month, and year and to which the vacant time slot of the user is input. A region of the vacant time slot in the vacant time slot calendar 51 is for example colored in a specific color. Regions of respective vacant time slots are hatched in FIG. 2. The vacant time slot calendar 51 includes a button 53 and a button 55.

When a user accesses the vacant time slot calendar 51 put on the network NW through the user terminal 300 of the user, the user is allowed to browse the vacant time slot calendar 51. In the above configuration in the present embodiment, the vacant time slots are visualized, thereby enabling the user to easily grasp user's free time.

Note that the schedule acquiring section 5 can acquire scheduled event data of a user from the calendar data stored in the calendar server 200 and the control section 3 can cause the storage 17 to store the scheduled event data. Further, the vacant time slot computing section 7 may read out the scheduled event data and the schedule time data from the storage 17 and inputs contents, a schedule time, and a schedule period of a scheduled event to the vacant time slot calendar 51. Furthermore, the interface section 13 can receive scheduled event data representing contents of a scheduled event input to the user terminal 300 by the user and the schedule time data representing a schedule time from the user terminal 300 via the communication section 15, and the control section 3 can update the scheduled event data and the schedule time data stored in the storage 17 based on the scheduled event data and the schedule time data received by the interface section 13. In the above configuration, the user can manually input contents, a schedule time, and a schedule period of a scheduled event. The vacant time slot computing section 7 re-computes a vacant time slot upon update of the schedule time data, and the control section 3 updates the vacant time slot data stored in the storage 17 based on the vacant time slot data representing the re-computed vacant time slot.

Description will be continued about the character string generating section 9 and the vacant time slot comparing section 11 with reference to FIGS. 1 and 2.

The character string generating section 9 will be described with reference to the user terminal 300. When the button 53 of the vacant time slot calendar 51 is pushed by user operation on the input device 300b, the user terminal 300 transmits a request for vacant time slot disclosure (also referred to below as a "disclosure request") to the vacant time slot managing device 1.

The character string generating section 9 generates a character string for disclosing vacant time slots of the user in response to the disclosure request from the user terminal 300. The character string for vacant time slot disclosure represents for example an address on the network NW at which the vacant time slot calendar 51 of the user is located. The character string representing the address refers to for example a uniform resource locator (URL). Alternatively, the character string for vacant time slot disclosure represents for example the vacant time slot of the user. The character string representing the vacant time slot represents for example "ZZZ (user's name) is unoccupied from 14:00 to 16:00".

The character string generating section 9 transmits the character string for disclosing a vacant time slot of the user to the user terminal 300 via the communication section 15. The user terminal 300 then causes the display 300a to display the character string for disclosing the vacant time slot. In the above configuration, the user can be allowed to transmit the character string for vacant time slot disclosure to a terminal of a third person.

As a result, in a configuration for example in which the character string for vacant time slot disclosure represents an address of the vacant time slot calendar 51 of the user, the third person is allowed to browse the vacant time slot calendar 51 through access to the address of the vacant time slot calendar 51. Alternatively, in a configuration for example in which the character string for vacant time slot disclosure represents a vacant time slot, the third person is allowed to learn the vacant time slots of the user through the terminal of the third person.

The vacant time slot comparing section 11 will be described with reference to the user terminal 300. When the button 55 of the vacant time slot calendar 51 is pushed by user operation on the input device 300b, the user terminal 300 transmits a request for vacant time slot comparison (also referred to below as a "comparison request") to the vacant time slot managing device 1.

In response to the comparison request from the user terminal 300, the vacant time slot comparing section 11 executes comparison among vacant time slots of a plurality of users belonging to a specific group and generates comparison data. The vacant time slot comparing section 11 then transmits the comparison data to user terminals 300 of the respective users belonging to the specific group.

The above comparison is for example to compute an overlapping time slot among the vacant time slots of the respective users belonging to the specific group (also referred to below as an "overlap vacant time slot"). Data representing the overlap vacant time slots is the comparison data in the present example. The users belonging to the specific group can accordingly learn the overlap vacant time slots through the respective user terminals 300. Alternatively, the above comparison is for example to superimpose vacant time slot calendars 51 of the respective users belonging to the specific group. The comparison data is data representing a superimposed vacant time slot calendar 51 or a character string indicating an address on the network NW at which the superimposed vacant time slot calendar 51 is located in the above example. In the above configuration, the users belonging to the specific group can browse the superimposed vacant time slot calendar through the respective user terminals 300.

Figure 3:
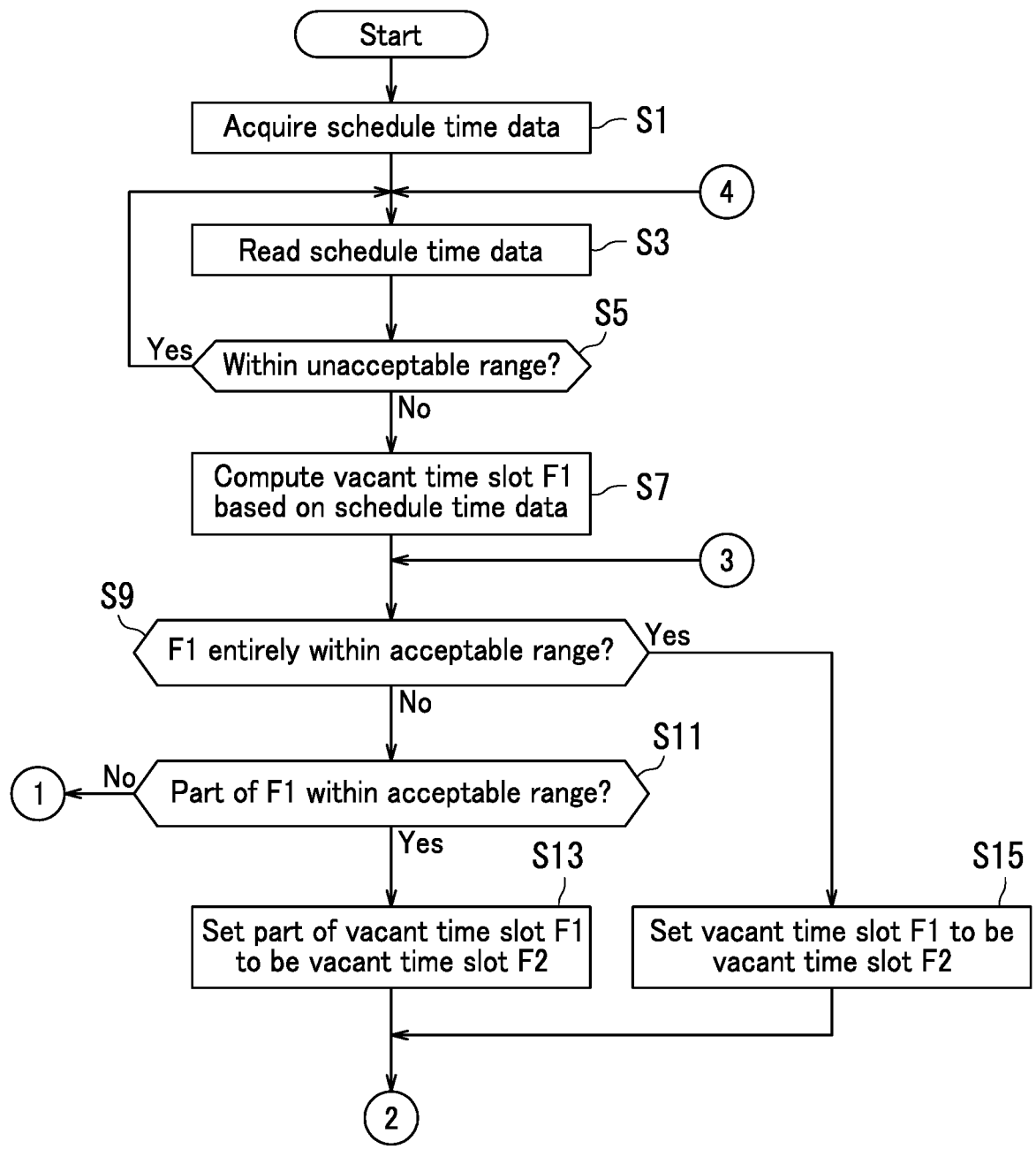
FIG. 3 is a flowchart depicting a former half of vacant time slot computation performed by the vacant time slot managing device according to the embodiment of the present invention.
Figure 4:
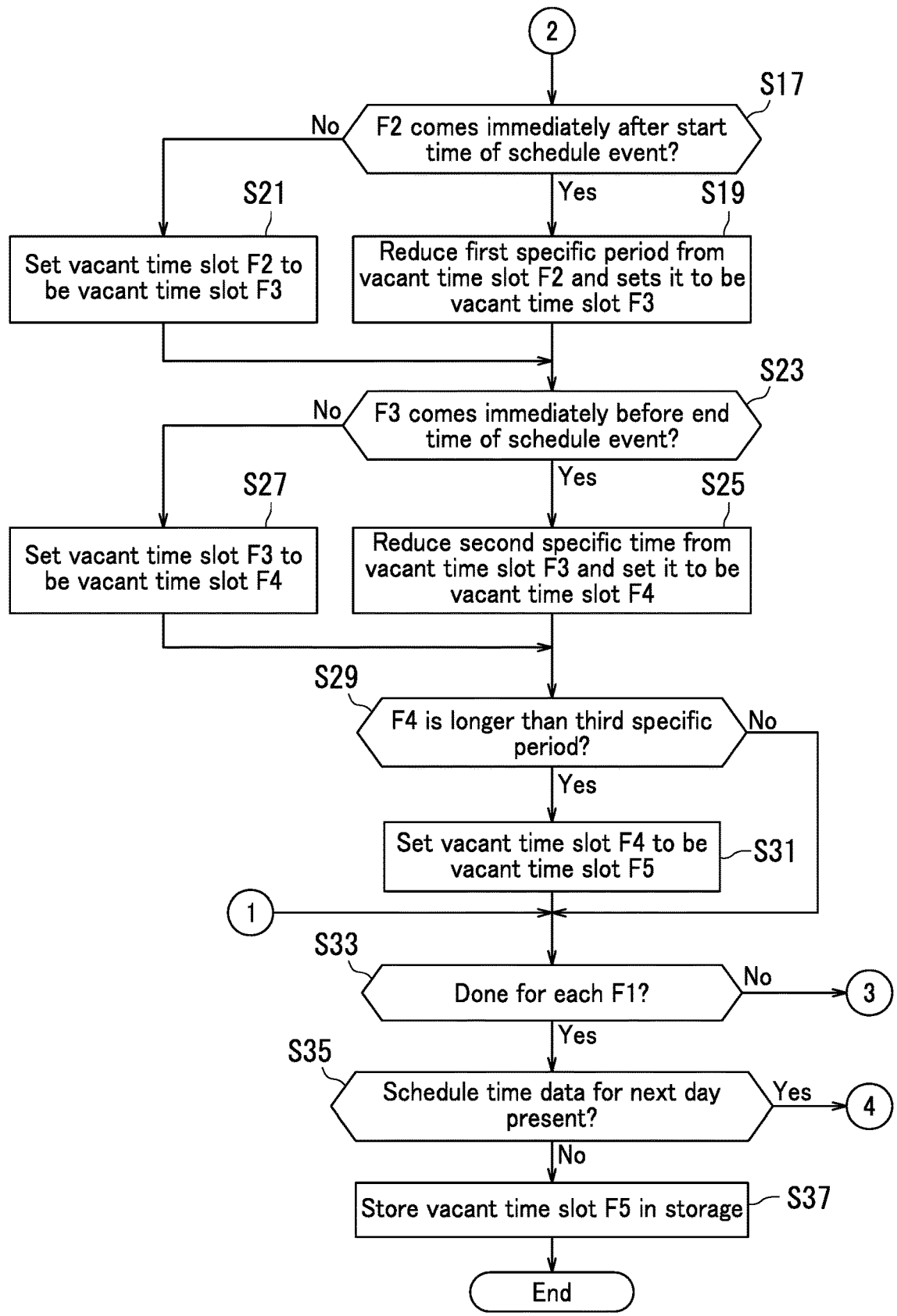
FIG. 4 is a flowchart depicting a latter half of the vacant time slot computation performed by the vacant time slot managing device according to the embodiment of the present invention.
Figure 5:
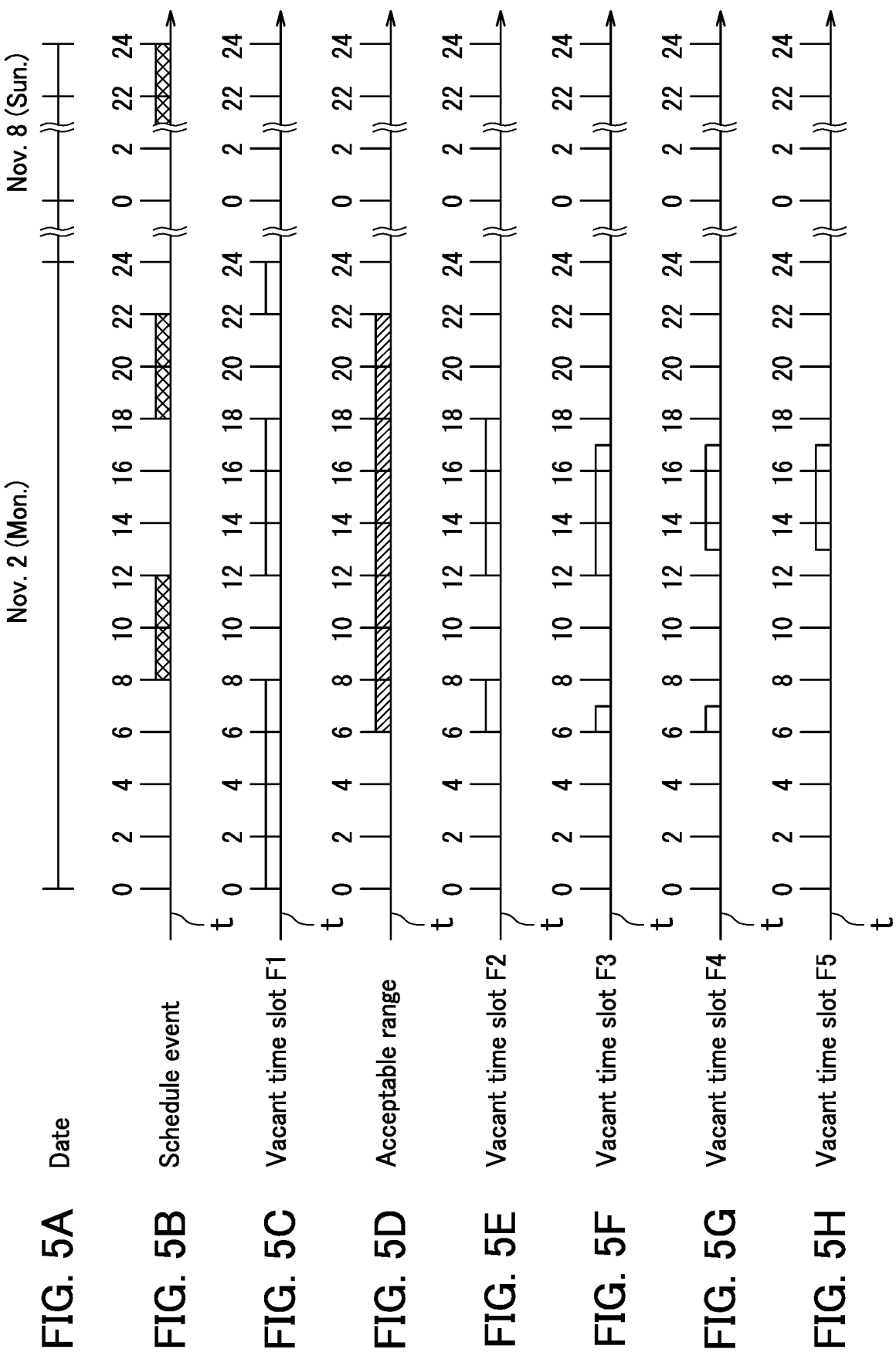
FIG. 5A is a chart indicating dates that each are a target for vacant time slot computation performed by the vacant time slot managing device according to the embodiment of the present invention.
FIG. 5B is a chart indicating times and periods of respective scheduled events that each are a target for vacant time slot computation performed by the vacant time slot managing device according to the embodiment of the present invention.
FIG. 5C is a chart indicating vacant time slots F1 computed by the vacant time slot managing device according to the embodiment of the present invention.
FIG. 5D is a chart indicating a vacant time slot setting acceptable range used by the vacant time slot managing device according to the embodiment of the present invention.
FIG. 5E is a chart indicating vacant time slots F2 computed by the vacant time slot managing device according to the embodiment of the present invention.
FIG. 5F is a chart indicating vacant time slots F3 computed by the vacant time slot managing device according to the embodiment of the present invention.
FIG. 5G is a chart indicating vacant time slots F4 computed by the vacant time slot managing device according to the embodiment of the present invention.
FIG. 5H is a chart indicating a vacant time slot F5 computed by the vacant time slot managing device according to the embodiment of the present invention.

The following describes vacant time slot computation performed by the vacant time slot managing device 1 with reference to FIGS. 1 and 3-5H. FIGS. 3 and 4 are flowcharts respectively depicting former and latter halves of the vacant time slot computation performed by the vacant time slot managing device 1. FIG. 5A is a chart indicating dates that each are a target for vacant time slot computation. FIG. 5B a chart indicating schedule times and schedule periods that each are a target for vacant time slot computation. In FIG. 5B, the schedule periods are each indicated as a hatched zone. Of opposite ends of the zone indicating the schedule period, an end close to 0 o'clock indicates a start time of a scheduled event and an end close to 24 o'clock indicates an end time of the scheduled event. FIG. 5C is a chart indicating vacant time slots F1. The vacant time slots F1 each are indicated as a white zone in FIG. 5C. FIG. 5D is a chart indicating the vacant time slot setting acceptable range. The vacant time slot setting acceptable range is indicated as a hatched zone in FIG. 5D. FIG. 5E is a chart indicating vacant time slots F2. FIG. 5F is a chart indicating vacant time slots F3. FIG. 5G is a chart indicating vacant time slots F4. FIG. 5H is a chart indicating a vacant time slot F5. The vacant time slots F1 to F5 are each indicated as a white zone in FIGS. 5E to 5H.

As illustrated in FIGS. 1, 3, and 4, the vacant time slot managing device 1 executes vacant time slot computation from Steps S1 through to S37 on a user by user basis. The following describes processing for a certain user.

As illustrated in FIG. 3, the schedule acquiring section 5 acquires schedule time data of the user for a specific number of days from the calendar server 200 and causes the storage 17 to store it at Step S1.

The vacant time slot computing section 7 reads out schedule time data in a time range from 0'oclock to 24 o'clock from the storage 17 at Step S3.

The vacant time slot computing section 7 determines whether or not a schedule time represented by the schedule time data falls in a day of week stored as a vacant time slot setting unacceptable range at Step S5. The day of week stored as a vacant time slot setting unacceptable range is Sunday in the description with reference to FIGS. 3 and 5A-5H.

When the vacant time slot computing section 7 makes positive determination (Yes at Step S5), the routine proceeds to Step S3. Accordingly, as illustrated in FIGS. 5A to 5H, no vacant time slot is computed and no vacant time slot is set in the Sunday that is the vacant time slot setting unacceptable range.

On the other hand, when the vacant time slot computing section 7 makes negative determination (No at Step S5), the routine proceeds to Step S7.

At Step S7, the vacant time slot computing section 7 computes a vacant time slot F1 of the user based on the schedule time data. Specifically, the vacant time slot computing section 7 sets a time period except a schedule period represented by the schedule time data in a time zone from 0 o'clock to 24 o'clock to be a vacant time slot F1. For example, as illustrated in FIGS. 5A to 5C, the vacant time slot computing section 7 sets a time slot from 0 o'clock to 8 o'clock, a time slot from 12 o'clock to 18 o'clock, and a time slot from 22 o'clock to 24 o'clock to each be a vacant time slot F1.

At step S9, the vacant time slot computing section 7 determines whether or not one of the vacant time slots F1 entirely falls in the vacant time slot setting acceptable range. As illustrated in FIG. 5D, the vacant time slot setting acceptable range ranges for example from 6 o'clock to 22 o'clock.

When the vacant time slot computing section 7 makes positive determination (Yes at Step S9), the routine proceeds to Step S15.

At Step S15, the vacant time slot computing section 7 sets the vacant time slot F1 to be a vacant time slot F2. For example, as illustrated in FIGS. 5C to E5, the vacant time slot computing section 7 sets a vacant time slot F1 ranging from 12 o'clock to 18 o'clock to be a vacant time slot F2.

On the other hand, when the vacant time slot computing section 7 makes negative determination (No at Step S9), the routine proceeds to Step S11.

At step S11, the vacant time slot computing section 7 determines whether or not a part of the vacant time slot F1 falls in the vacant time slot setting acceptable range.

When the vacant time slot computing section 7 makes positive determination (Yes at Step S11), the routine proceeds to Step S13.

At Step S13, the vacant time slot computing section 7 sets the part of the vacant time slot F1 to be a vacant time slot F2. For example, as illustrated in FIGS. 5C to 5E, a time slot from 6 o'clock to 8 o'clock of the vacant time slot F1 ranging from 0 o'clock to 8 o'clock that falls within the vacant time slot setting acceptable range is set as a vacant time slot F2.

On the other hand, the vacant time slot computing section 7 makes negative determination (No at Step S11), that is, when the vacant time slot F1 entirely falls out of the vacant time slot setting acceptable range, the routine proceeds to Step S33 in FIG. 4. In the above configuration, as illustrated for example in FIGS. 5C to 5E, a vacant time slot F1 ranging from 22 o'clock to 24 o'clock is not set to be a vacant time slot F2.

As illustrated in FIG. 3, the vacant time slot computing section 7 determines whether or not the vacant time slot F2 comes immediately after a start time of a scheduled event represented by the schedule time data at Step S17.

When the vacant time slot computing section 7 makes positive determination (Yes at Step S17), the routine proceeds to Step S19.

At Step S19, the vacant time slot computing section 7 reduces a first specific period FT from the vacant time slot F2 and sets a resultant remaining vacant time slot F2 to be a vacant time slot F3. Specifically, the vacant time slot computing section 7 sets a time period ranging from a start time that is the start time of the vacant time slot F2 to an end time at a time point put forward by the first specific period FT from the end time of the vacant time slot F2 to be a vacant time slot F3. The first specific period FT is one hour in the description with reference to FIGS. 4 and 5A-5H. For example, as illustrated in FIGS. 5B, 5E, and 5F, a vacant time slot F2 ranging from 12 o'clock to 18 o'clock comes immediately before 18 o'clock that is the start time of another scheduled event. As such, a vacant time slot F3 is set to range from a start time at 12 o'clock, which is the start time of the vacant time slot F2, to an end time at 17 o'clock that is a time put forward by one hour from 18 o'clock, which is the end time of the vacant time slot F2.

On the other hand, when the vacant time slot computing section 7 makes negative determination (No at Step S17), the routine proceeds to Step S21.

At Step S21, the vacant time slot computing section 7 sets a vacant time slot F2 to be a vacant time slot F3.

At step S23, the vacant time slot computing section 7 determines whether or the vacant time slot F3 comes immediately before an end time of a scheduled event represented by the schedule time data.

When the vacant time slot computing section 7 makes positive determination (Yes at Step S23), the routine proceeds to Step S25.

At Step S25, the vacant time slot computing section 7 reduces a second specific period ST from the vacant time slot F3 and sets a resultant remaining vacant time slot F3 to be a vacant time slot F4. Specifically, the vacant time slot computing section 7 sets the vacant time slot F3 to be a vacant time slot F4 ranging from a start time that is a time point put behind by the second specific period ST from the start time of the vacant time slot F2 to an end time that is the end time of the vacant time slot F2. The second specific period ST is one hour in the description with reference to FIGS. 4 and 5A-5H. For example, as illustrated in FIGS. 5B, 5F, and 5G, a time slot F3 ranging from 12 o'clock to 17 o'clock comes immediately before 12 o'clock that is the end time of a scheduled event. As such, a vacant time slot F4 is set to range a start time at 13 o'clock that is a time put behind by one hour from 12 o'clock, which is the start time of the vacant time slot F3, to an end time at 17 o'clock, which is the end time of the vacant time slot F3.

On the other hand, when the vacant time slot computing section 7 makes negative determination (No at Step S23), the routine proceeds to Step S27.

At Step S27, the vacant time slot computing section 7 sets a vacant time slot F3 to be a vacant time slot F4.

At step S29, the vacant time slot computing section 7 determines whether or not the vacant time slot F4 is longer than the third specific period TT. The third specific period TT is one hour in the description with reference to FIGS. 4 and 5A-5H.

When the vacant time slot computing section 7 makes negative determination (No at Step S29), the routine proceeds to Step S33. In the above configuration, a vacant time slot F4 from 6 o'clock to 7 o'clock is not set to be a vacant time slot F5, as illustrated in for example FIGS. 5G and 5H.

On the other hand, when the vacant time slot computing section 7 makes positive determination (Yes at Step S29), the routine proceeds to Step S31.

At Step S31, the vacant time slot computing section 7 sets a vacant time slot F4 to be a vacant time slot F5. As illustrated in for example FIGS. 5G and 5H, the vacant time slot F4 ranging from 13 o'clock to 17 o'clock is set to be a vacant time slot F5.

At Step S33, the vacant time slot computing section 7 determines whether or not Steps S9 through to S31 are executed for all of the vacant time slots F1 included in the range from 0 o'clock to 24 o'clock.

When the vacant time slot computing section 7 makes negative determination (No at Step S33), the routine proceeds to Step S9 in FIG. 3. When the range from 0 o'clock to 24 o'clock includes three vacant time slots F1 as illustrated in for example FIG. 5C, the processing from Steps S9 through to S31 is executed three times.

On the other hand, when the vacant time slot computing section 7 makes positive determination (Yes at Step S33), the routine proceeds to Step S35.

At Step S35, the schedule acquiring section 5 determines whether or not schedule time data for the next day is stored in the storage 17.

When the schedule acquiring section 5 makes positive determination (Yes at Step S35), the routine proceeds to Step S3 in FIG. 3.

On the other hand, when the schedule acquiring section 5 makes negative determination (No at Step S35), the routine proceeds to Step S37.

At Step S37, the control section 3 causes the storage 17 to store vacant time slot data representing the vacant time slot F5 in correlation with the user and the date.

Note that the schedule times, the schedule periods, the vacant time slot setting acceptable range, and the vacant time slots F1 to F5 are set on a time axis t in FIGS. 5A to 5H.

Figure 6:
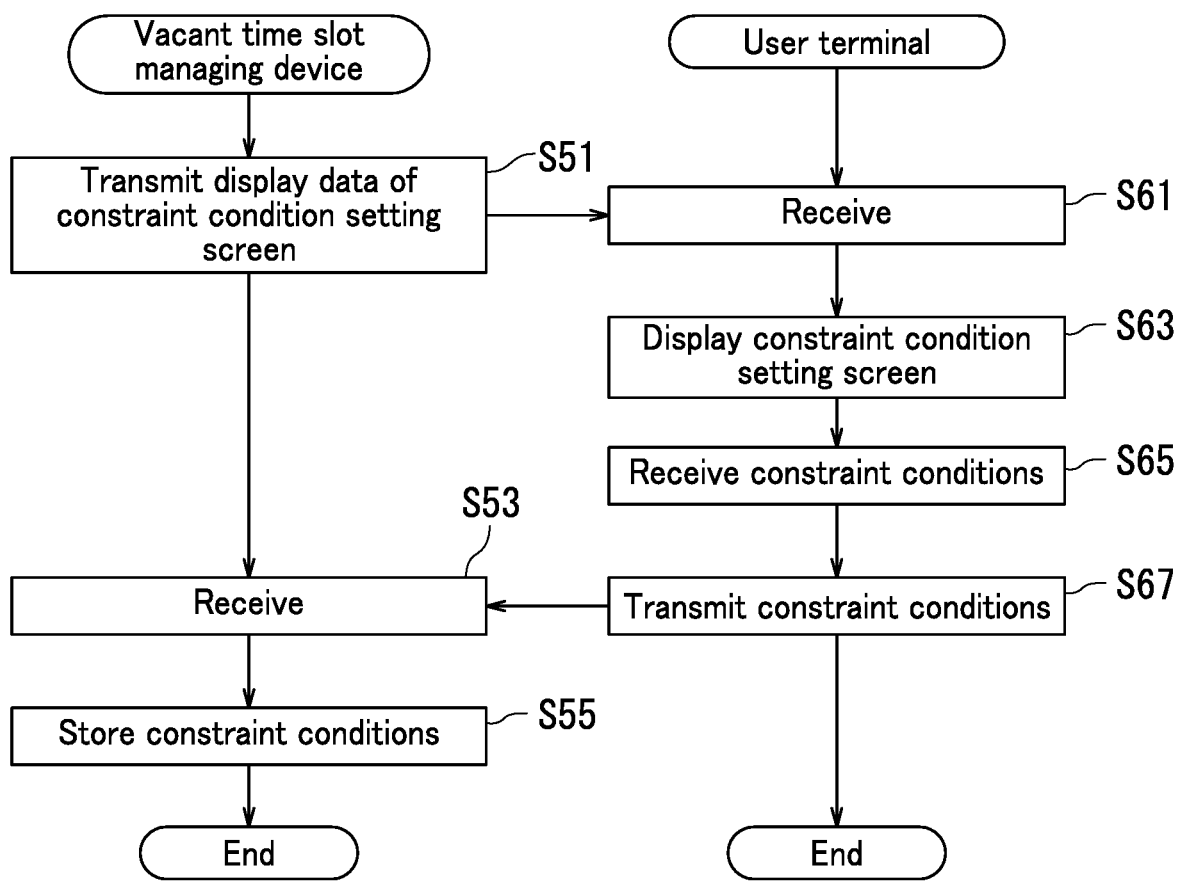
FIG. 6 is a flowchart depicting constraint condition setting performed by the vacant time slot managing device according to the embodiment of the present invention.
Figure 7:
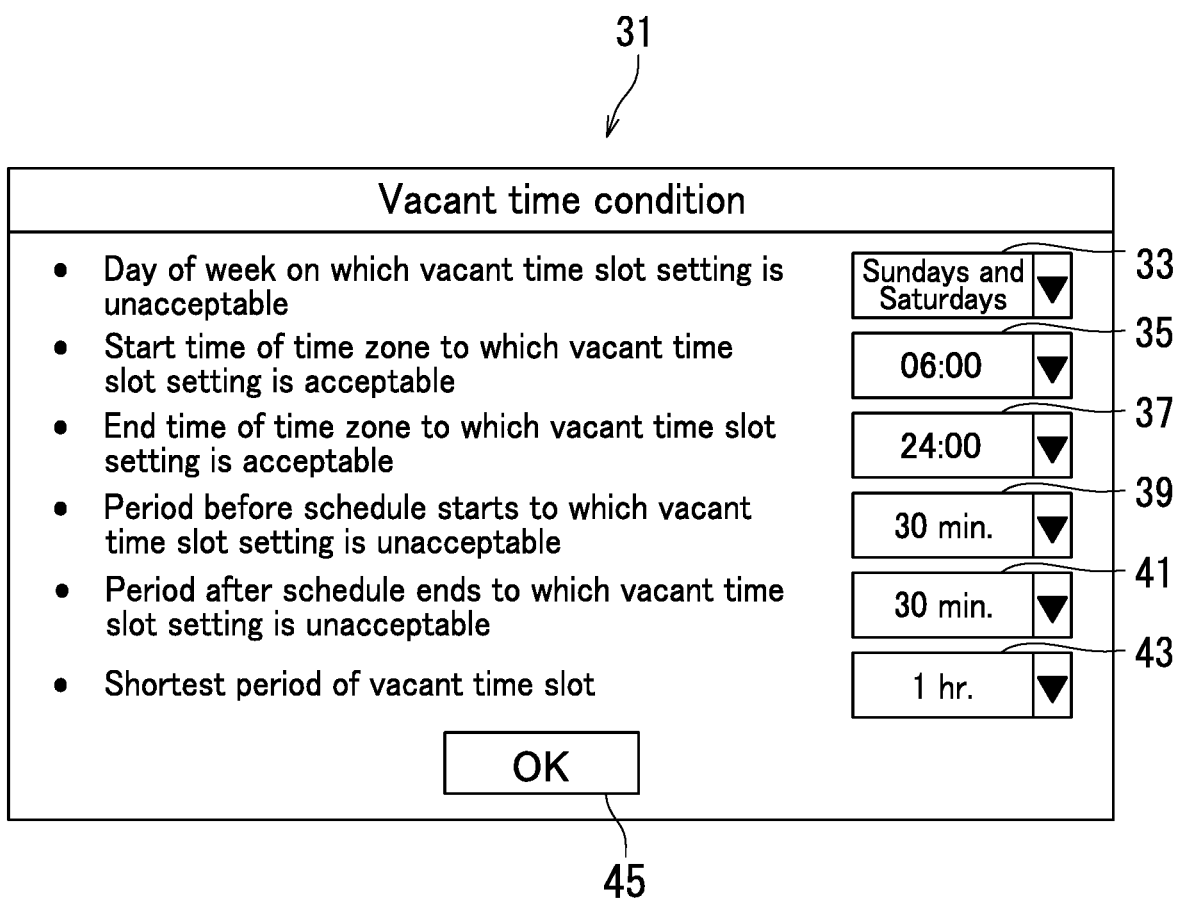
FIG. 7 is a diagram illustrating a constraint condition setting screen presented by the vacant time slot managing device according to the embodiment of the present invention.

The following describes constraint condition setting performed by the vacant time slot managing device 1 with reference to FIGS. 1, 6, and 7. FIG. 6 is a flowchart depicting constraint condition setting performed by the vacant time slot managing device 1. FIG. 7 is a diagram illustrating a constraint condition setting screen 31 that the vacant time slot managing device 1 presents.

In response to a request from the user terminal 300, the interface section 13 transmits display data of the constraint condition setting screen 31 to a user terminal 300 via the communication section 15 at Step S51, as illustrated in FIGS. 1, 6, and 7. The display data of the constraint condition setting screen 31 is data for causing the display 300a of the user terminal 300 to display the constraint condition setting screen 31 and is for example HyperText Markup Language (HTML) data.

The user terminal 300 receives the display data at Step S61.

The user terminal 300 causes the display 300a to display the constraint condition setting screen 31 based on the display data at Step S63.

The constraint condition setting screen 31 includes pulldown menus 33-43 each for inputting a constraint condition and an enter button 45.

The pulldown menu 33 is for allowing the user to select a vacant time slot setting unacceptable range from among a plurality of items (e.g., Saturdays, Sundays, holidays, a set of Saturdays and Sundays, and a set of Saturdays, Sundays, and holidays). The pulldown menu 35 is for allowing the user to select a start time of the vacant time slot setting acceptable range from among a plurality of items (e.g., 00:00, 01:00, . . . , 20:00). The pulldown menu 37 is for allowing the user to select an end time of the vacant time slot setting acceptable range from among a plurality of items (e.g., 04:00, 10:00, . . . , 24:00).

The pulldown menu 39 is for allowing the user to select a first specific period FT from among a plurality of items (e.g., half an hour, one hour, one and a half hours, and two hours). The pulldown menu 41 is for allowing the user to select a second specific period ST from among a plurality of items (e.g., half an hour, one hour, one and a half hours, and two hours). The pulldown menu 43 is for allowing the user to select a third specific period TT from among a plurality of items (e.g., half an hour, one hour, one and a half hours, and two hours).

The enter button 45 is for transmitting to the vacant time slot managing device 1 the constraint conditions (data representing the vacant time slot setting unacceptable range, data representing the start time of the vacant time slot setting acceptable range, data representing the end time of the vacant time slot setting acceptable range, data representing the first specific period FT, data representing the second specific period ST, and data representing the third specific period TT) each selected at a corresponding one of the pulldown menus 33 to 43.

At step S65, the user terminal 300 receives constraint conditions through the pulldown menus 33 to 43.

At Step S67, the user terminal 300 transmits the constraint conditions to the vacant time slot managing device 1 in response to the enter button 45 being pushed by user operation on the input device 300b.

The communication section 15 receives the constraint conditions and the interface section 13 receives the constraint conditions via the communication section 15 at Step S53.

The control section 3 causes the storage 17 to store the constraint conditions at Step S55.

Figure 8:
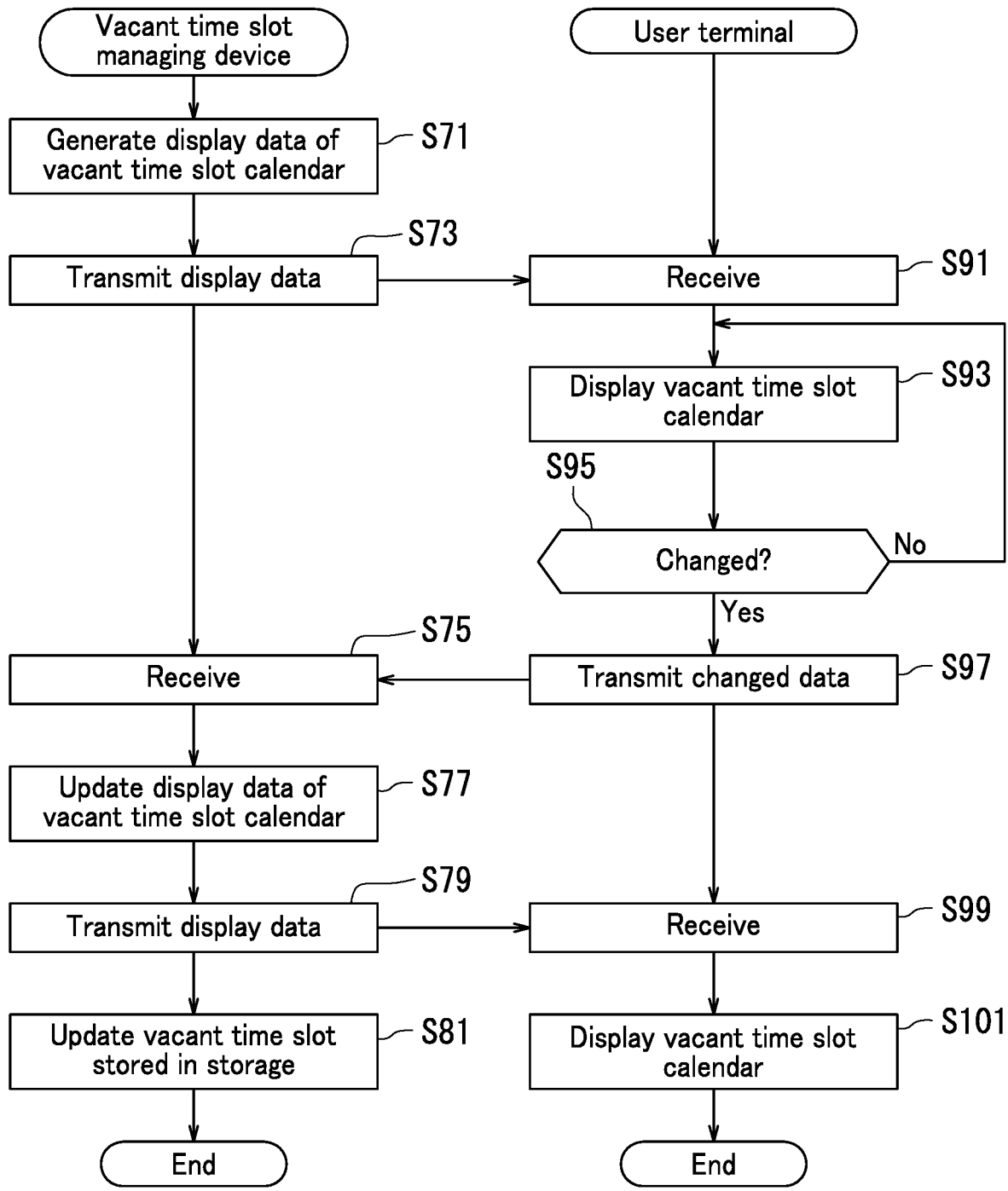
FIG. 8 is a flowchart depicting vacant time slot receiving performed by the vacant time slot managing device according to the embodiment of the present invention.

The following describes vacant time slot receiving performed by the vacant time slot managing device 1 with reference to FIGS. 1 and 8. FIG. 8 is a flowchart depicting vacant time slot receiving performed by the vacant time slot managing device 1.

In response to a request from a user terminal 300, the vacant time slot computing section 7 reads out the vacant time slot data from the storage 17 and generates display data of the vacant time slot calendar 51 (see FIG. 2) at Step S71, as illustrated in FIGS. 1 and 8. The display data of the vacant time slot calendar 51 is for causing the display 300a of the user terminal 300 to display the vacant time slot calendar 51 and is for example HTML data. Note that the display data of the vacant time slot calendar 51 may be pre-stored in the storage 17. In the above configuration, the vacant time slot computing section 7 periodically or non-periodically reads out the vacant time slot data from the storage 17 and periodically or non-periodically updates the display data of the vacant time slot calendar 51.

The vacant time slot computing section 7 transmits the display data of the vacant time slot calendar 51 to the user terminal 300 via the communication section 15 at Step S73.

The user terminal 300 receives the display data at Step S91.

The user terminal 300 causes the display 300a to display the vacant time slot calendar 51 based on the display data at Step S93.

At Step S95, the user terminal 300 determines whether or not a vacant time slot is changed by user operation on the input device 300b. The above change refers to modification, addition, or deletion.

When the user terminal 300 makes negative determination (No at Step S95), the routine proceeds to Step S93.

On the other hand, when the user terminal 300 makes positive determination (Yes at Step S95), the routine proceeds to Step S97.

At Step S97, the user terminal 300 transmits data representing changed contents of the vacant time slot to the vacant time slot managing device 1.

The communication section 15 receives the data representing the changed contents of the vacant time slot and the interface section 13 receives the changed contents of the vacant time slot via the communication section 15 at Step S75.

At Step S77, the vacant time slot computing section 7 updates the display data of the vacant time slot calendar 51 based on the data representing the changed contents of the vacant time slot.

The vacant time slot computing section 7 transmits the display data of the vacant time slot calendar 51 to the user terminal 300 via the communication section 15 at Step S79.

The control section 3 updates data representing a corresponding vacant time slot stored in the storage 17 based on the data representing the changed contents of the vacant time slot at Step S81.

The user terminal 300 receives the display data at Step S99.

The user terminal 300 causes the display 300a to display the vacant time slot calendar 51 based on the display data at Step S101.

Figure 9:
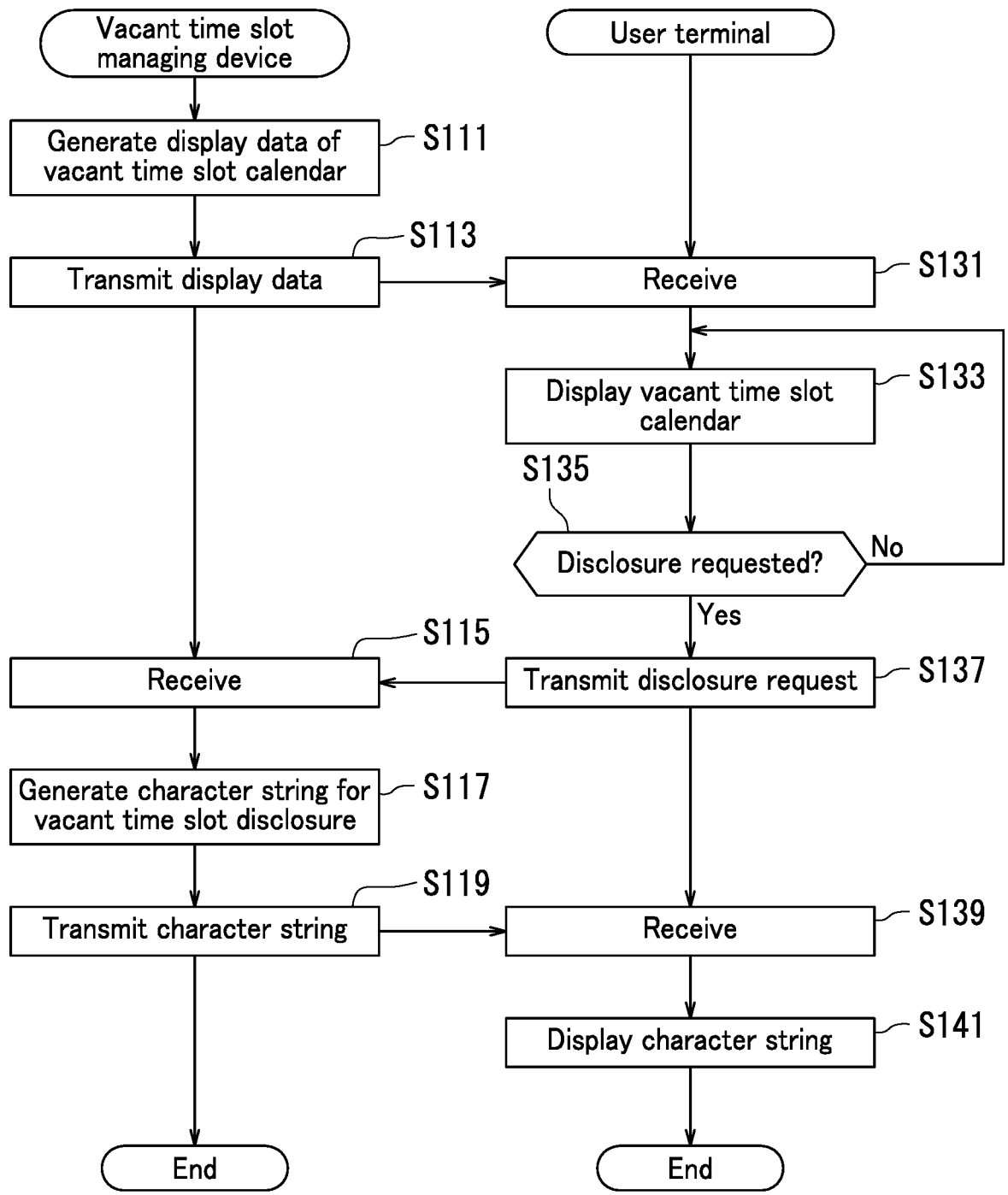
FIG. 9 is a flowchart depicting vacant time slot disclosure performed by the vacant time slot managing device according to the embodiment of the present invention.

The following describes vacant time slot disclosure performed by the vacant time slot managing device 1 with reference to FIGS. 1 and 9. FIG. 9 is a flowchart depicting vacant time slot disclosure performed by the vacant time slot managing device 1.

In response to a request from a user terminal 300, the vacant time slot computing section 7 reads out the vacant time slot data from the storage 17 and generates display data of the vacant time slot calendar 51 (see FIG. 2) at Step S111, as illustrated in FIGS. 1 and 9.

The vacant time slot computing section 7 transmits the display data of the vacant time slot calendar 51 to the user terminal 300 via the communication section 15 at Step S113.

The user terminal 300 receives the display data at Step S131.

The user terminal 300 causes the display 300a to display the vacant time slot calendar 51 based on the display data at Step S133.

At Step S135, the user terminal 300 determines whether or not a disclosure request is input by user operation on the input device 300b. Specifically, the user terminal 300 determines whether or not the button 53 of the vacant time slot calendar 51 is pushed.

When the user terminal 300 makes negative determination (No at Step S135), the routine proceeds to Step S133.

On the other hand, when the user terminal 300 makes positive determination (Yes at Step S135), the routine proceeds to Step S137.

The user terminal 300 transmits the disclosure request to the vacant time slot managing device 1 at Step S137.

The communication section 15 receives the disclosure request and the interface section 13 receives the disclosure request via the communication section 15 at Step S115.

At Step S117, the character string generating section 9 generates a character string for vacant time slot disclosure in response to the disclosure request.

The character string generating section 9 transmits the character string for vacant time slot disclosure to the user terminal 300 via the communication section 15 at Step S119.

The user terminal 300 receives the character string at Step S139.

The user terminal 300 causes the display 300a to display the character string at Step S141.

Figure 10:
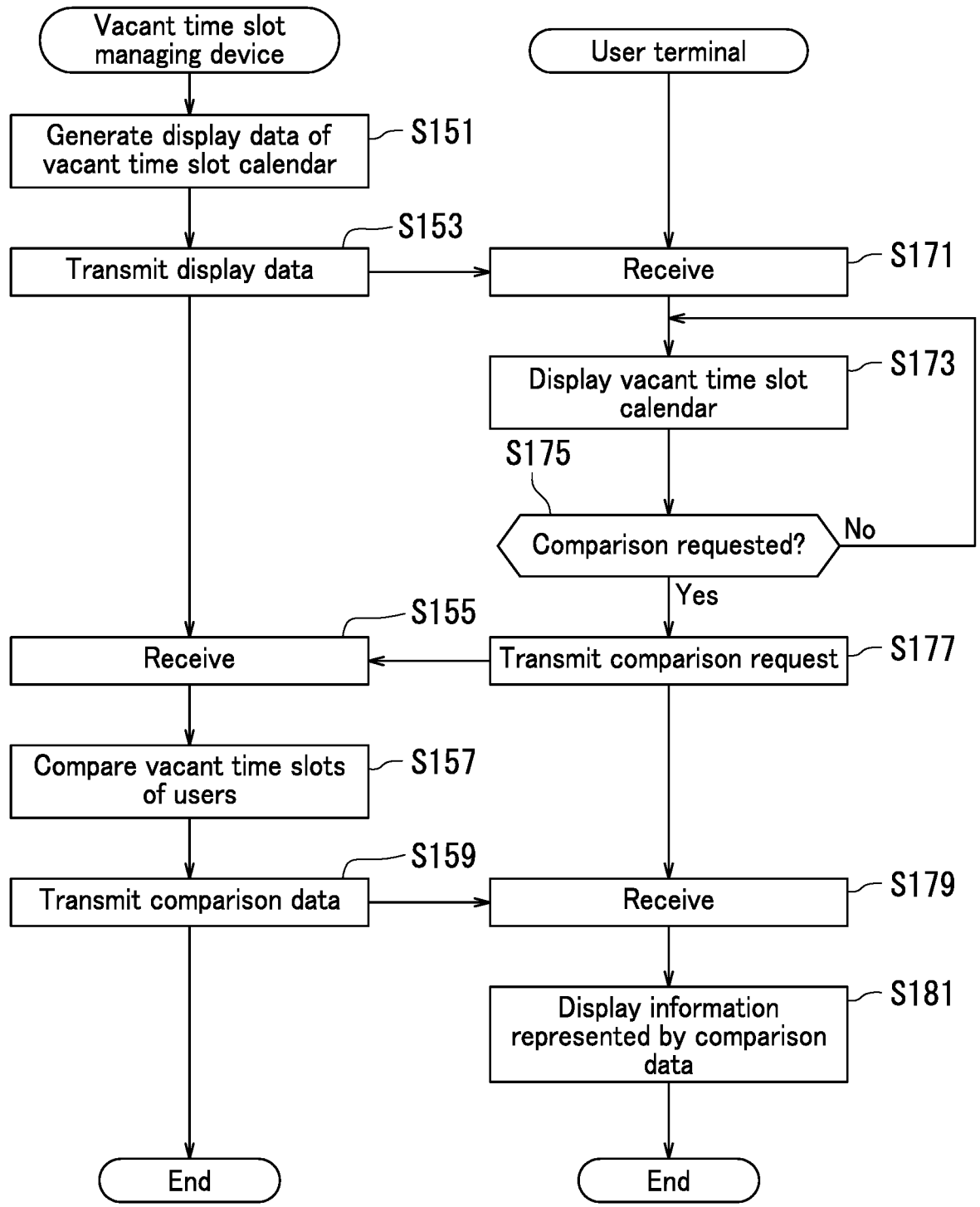
FIG. 10 is a flowchart depicting vacant time slot comparison performed by the vacant time slot managing device according to the embodiment of the present invention.

The following describes vacant time slot comparison performed by the vacant time slot managing device 1 with reference to FIGS. 1 and 10. FIG. 10 is a flowchart depicting vacant time slot comparison performed by the vacant time slot managing device 1.

In response to a request from the user terminal 300, the vacant time slot computing section 7 reads out the vacant time slot data from the storage 17 and generates display data of the vacant time slot calendar 51 (see FIG. 2) at Step 151, as illustrated in FIGS. 1 and 10.

The vacant time slot computing section 7 transmits the display data of the vacant time slot calendar 51 to the user terminal 300 via the communication section 15 at Step S153.

The user terminal 300 receives the display data at step S171.

The user terminal 300 causes the display 300*a* to display the vacant time slot calendar 51 based on the display data at Step S173.

At Step S175, the user terminal 300 determines whether or not a comparison request is input by user operation on the input device 300*b*. Specifically, the user terminal 300 determines whether or not the button 55 of the vacant time slot calendar 51 is pushed.

When the user terminal 300 makes negative determination (No at Step S175), the routine proceeds to Step S173.

On the other hand, when the user terminal 300 makes positive determination (Yes at Step S175), the routine proceeds to Step S177.

The user terminal 300 transmits the comparison request to the vacant time slot managing device 1 at Step S177.

The communication section 15 receives the comparison request and the interface section 13 receives the comparison request via the communication section 15 at Step S155.

The vacant time slot comparing section 11 performs comparison among vacant time slots of a plurality of users belonging to a specific group and generates comparison data at Step S157.

The vacant time slot comparing section 11 transmits the comparison data to the user terminal 300 via the communication section 15 at Step S159.

The user terminal 300 receives the comparison data at Step S179.

The user terminal 300 causes the display 300*a* to display information represented by the comparison data at Step S181.

Figure 11:
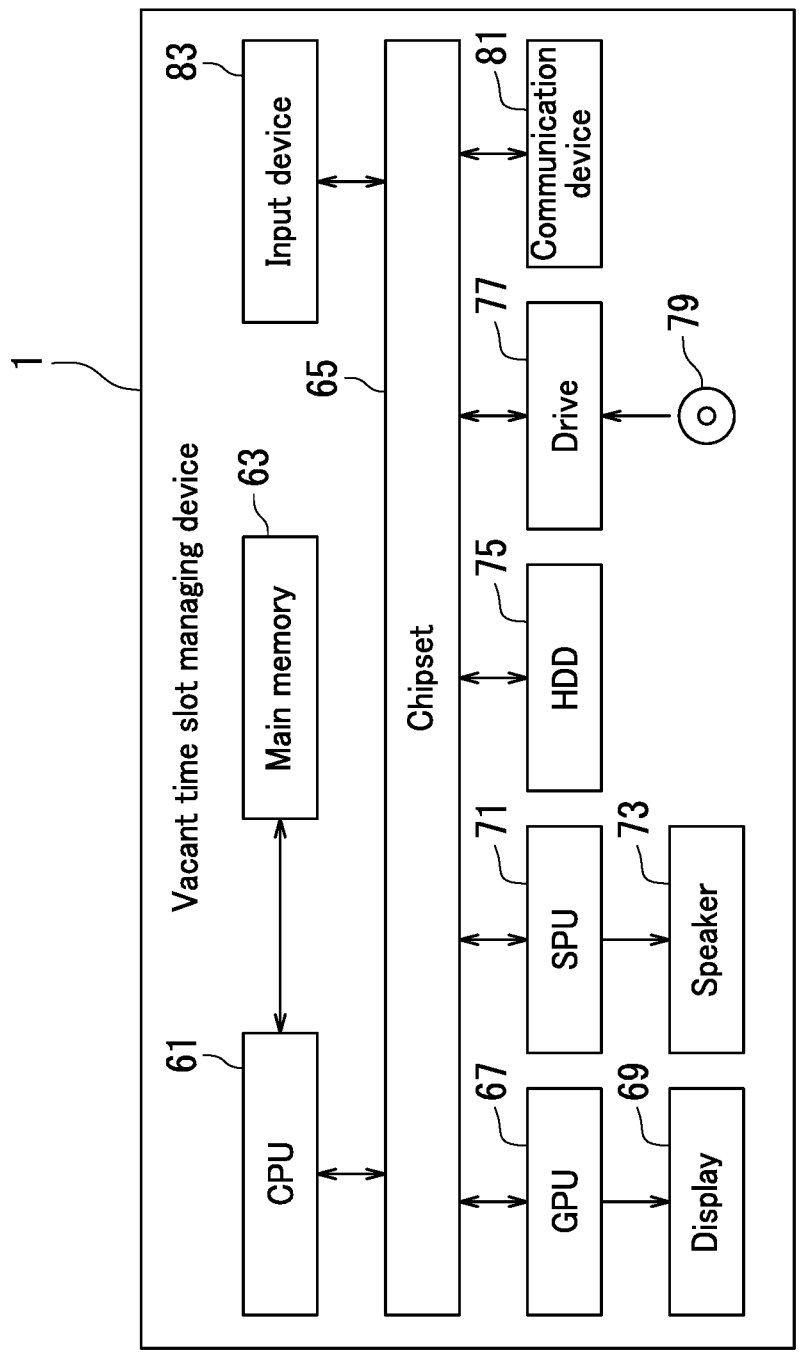
FIG. 11 is a diagram illustrating a hardware configuration of the vacant time slot managing device according to the embodiment of the present invention.

The following describes a hardware configuration of the vacant time slot managing device 1 with reference to FIGS. 1 and 11. FIG. 11 is a diagram illustrating the hardware configuration of the vacant time slot managing device 1. As illustrated in FIG. 11, the vacant time slot managing device 1 includes a central processing unit (CPU) 61 as a computer, main memory 63, a chipset 65, a graphics processing unit (GPU) 67, a display 69, a sound processing unit (SUP) 71, a speaker 73, a hard disk drive (HDD) 75, a drive 77, a communication device 81, and an input device 83.

The CPU 61 performs various arithmetic operations through execution of computer programs stored in the HDD 75. For example, the computer programs causes the CPU 61 to execute the processing from Steps S1 through to S37 in FIGS. 3 and 4, the processing from Steps S51 through to S55 in FIG. 6, the processing from Steps S71 through to S81 in FIG. 8, the processing from Steps S111 through to S119 in FIG. 9, and the processing from Steps S151 through to S159 in FIG. 10. As such, the CPU 61 functions as the control section 3, the schedule acquiring section 5, the vacant time slot computing section 7, the character string generating section 9, the vacant time slot comparing section 11, and the interface section 13 through execution of the computer programs. As a result, vacant time slots of the users can be managed and utilization of respective users' free time can be supported. The computer programs may be stored in a removable storage medium 79 for distribution or distributed via the network NW.

The main memory 63 is high-speed memory into and from which the CPU 61 directly writes and reads, and functions as a part of the storage 17. The GPU 67 executes graphics processing and provides video signals to the display 69. The display 69 displays video according to the provided video signals. The SPU 71 executes sound processing to provide sound signals to the speaker 73. The speaker 73 outputs sound according to the provided sound signals.

The HDD 75 is auxiliary storage for storing the computer programs and data. The HDD 75 functions as a main part of the storage 17. The drive 77 reads and writes data from and into the removable storage medium 79. Note that the removable storage medium 79, the HDD 75, and the main memory 63 each are an example of a storage medium.

The communication device 81 executes connection to the network NW to control communication. The communication device 81 functions as the communication section 15. The input device 83 includes pointing devices such as a mouse and a keyboard. Respective functional units including the CPU 61, the GPU 67, the SPU 71, the HDD 75, the drive 77, the communication device 81, and the input device 83 are connected to the chipset 65. The chipset 65 manages data transmission and receiving among the functional units.

An embodiment and examples of the present invention have been described so far with reference to the drawings. However, the present invention is not limited to the above-described embodiment and the examples and can be practiced in various ways within the scope without departing from the essence of the present invention (for example, (1) to (8) described below). Furthermore, a plurality of elements of configuration disclosed in the above embodiment can be combined as appropriate to form various inventions. For example, some of the elements of configuration in the embodiment may be omitted. The drawings are schematic illustrations that emphasize elements of configuration in order to facilitate understanding thereof. Therefore, in order that elements of configuration can be easily illustrated, the numbers and the like of the respective elements of configuration in the drawings may differ from the actual ones thereof. The elements of configuration in the above embodiment are merely examples that do not impose any particular limitations and can be altered in various ways to the extent that there is not substantial deviation from the advantages of the present disclosure.

(1) The processing from Steps S1 through to S37 in FIGS. 3 and 4, the processing from Steps S51 through to S55 in FIG. 6, the processing from Steps S71 through to S81 in FIG. 8, the processing from Steps S111 through to S119 in FIG. 9, and the processing from Steps S151 through to S159 in FIG. 10 each constitute a vacant time slot managing method. The vacant time slot managing device 1 implements the vacant time slot managing method. As a result, the vacant time slots of the users can be managed and utilization of respective users' free time can be supported.

(2) The order of Steps from S1 to S37 in FIGS. 3 and 4, the order of Steps from S51 to S55 in FIG. 6, the order of Steps from S71 to S81 in FIG. 8, the order of Steps from S111 to S119 in FIG. 9, and the order of Steps from S151 to S159 in FIG. 10 can each be changed appropriately.

(3) The character string generating section 9 may generate a character string representing an address of the vacant time slot calendar 51 in response to pushing of the button 53 in FIG. 2 and generate, in response to clicking in a region indicating a vacant time slot (hatched region) in the vacant time slot calendar 51, a character string representing a vacant time slot corresponding to the clicked region. Furthermore, the character string generating section 9 may differentiate in color the clicked region from a non-clicked region among regions indicating the respective vacant time slots in the vacant time slot calendar 51.

(4) As has been described with reference to FIGS. 1 and 2, an interface through which the user terminal 300 accesses the vacant time slot managing device 1 is, but is not limited to, the vacant time slot calendar 51.

(4-A) For example, the user terminal 300 stores a contact address table indicating contact addresses of a plurality of persons (also referred to below as "registered persons"). The contact addresses each include identification information, a tile or name, an address or residence, and a communication address of a registered person. The contact address table is a table in which identification information, tiles or names, addresses or residences, and communication addresses of the respective registered persons are correlated with one another on a basis of registered person by registered person. The communication address is for example a telephone number or a mail address of a registered person.

When a user (also referred to below as a first user) operates the user terminal 300 to select a contact address from the contact address table, the user terminal 300 transmits a communication address included in the selected contact address to the vacant time slot managing device 1. The control section 3 searches for a communication address matching with the communication address received from the user terminal 300 from the database DB. The control section 3 acquires vacant time slot data of another user (also referred to below as a "second user") correlated with the searched communication address from the database DB. The second user is a registered person possessing the selected address.

The character string generating section 9 generates a character string for disclosing vacant time slots represented by the vacant time slot data of the second user and transmits the character string for disclosing the vacant time slots to the user terminal 300 of the first user via the communication section 15. The character string is the same as the character string generated by the character string generating section 9 as described with reference to FIGS. 1 and 2.

Alternatively, the control section 3 acquires the vacant time slot data of the first user in addition to that of the second user from the database DB. The vacant time slot comparing section 11 then executes comparison between the vacant time slots represented by the vacant time slot data of the first user and those of the second user and generates comparison data. The vacant time slot comparing section 11 then transmits the comparison data to the user terminal 300 of the first user via the communication section 15. The above comparison is for example processing to compute an overlap period (also referred to below as an "overlap vacant time slot") between the vacant time slots of the first user and those of the second user. Data representing the overlap vacant time slot corresponds to the comparison data in this example. Alternatively, the comparison is for example processing to superimpose the vacant time slot calendar 51 of the first user on that of the second user. Data representing the two vacant time slot calendars 51, which are superimposed, or a character string representing an address on the network NW at which the two vacant time slot calendars 51, which are superimposed, are located corresponds to the comparison data in this example.

(4-B) For example, a server connected to the network NW discloses a website providing an SNS. A plurality of persons (also referred to below as "registrant") are registered in the website. The server provides an dedicated page for each registrant and stores therein a contact address table. The dedicated page may be a page disclosed or not disclosed to a third person. The contact address table is the same as the contact address table described in (4-A) above. The registrants are allowed to access the contact address table via the their dedicated pages.

When a user (also referred to below as a "first user") operates the user terminal 300 to select a contact address from the contact address table through a dedicated page for the first user, the server transmits a communication address included in the selected contact address to the vacant time slot managing device 1. The first user is a user of the vacant time slot managing device 1 and a registrant of the website providing the SNS. The control section 3 searches for a communication address matching with the communication address received from the server from the database DB. The control section 3 acquires vacant time slot data of another user (also referred to below as a "second user") correlated with the searched communication address from the database DB. The second user is a registered person possessing the selected address.

The character string generating section 9 generates a character string for disclosing vacant time slots represented by the vacant time slot data of the second user and transmits the character string for disclosing the vacant time slots to the server via the communication section 15. The server transmits the character string for disclosing the vacant time slots to the user terminal 300 of the first user. The character string is the same as the character string generated by the character string generating section 9 as described with reference to FIGS. 1 and 2.

Alternatively, the server transmits account information issued to the first user in addition to the communication address included in the selected contact address to the vacant time slot managing device 1. The control section 3 searches for a communication address matching with the communication address received from the server from the database DB. The control section 3 acquires vacant time slot data of the second user correlated with the searched communication address from the database DB. The control section 3 also searches for account information matching with the account information received from the server from the database DB. The control section 3 acquires vacant time slot data of the first user correlated with the searched account information from the database DB. The vacant time slot comparing section 11 then performs comparison between the vacant time slots represented by the vacant time slot data of the first user and those of the second user and generates comparison data. The vacant time slot comparing section 11 transmits the comparison data to the server via the communication section 15. The server transmits the comparison data to the user terminal. The comparison and the comparison data are the same as those described in (4-A) above.

(5) The vacant time slot managing device 1 may transmit to the user terminal 300 information indicating a candidate for a scheduled event that is to be set in a vacant time slot (also referred to below as "candidate information") in correlation with the vacant time slot. For example, the vacant time slot computing section 7 transmits the candidate information in correlation with a vacant time slot to the user terminal 300. For example, the vacant time slot computing section 7 generates a vacant time slot calendar 51 in correlation with the candidate information and transmits the vacant time slot calendar 51 to the user terminal 300. The candidate information is, but is not limited to, information for example for user recommendation (e.g., amusement information, hobby information, shop information, meal information, local information, or self-development information). The user can decide a schedule event that is to be set in a vacant time slot while viewing the candidate information. Accordingly, free time of the user can be utilized in an effective manner. A trader indicated in the candidate information can execute business activity in an effective manner and can present goods or services indicated in the candidate information to the user.

(6) A variation of the vacant time slot comparison will be described with reference to FIGS. 1 and 2. In the variation, a user terminal 300 of a user (also referred to below as a "first user") receives a character string (e.g., URL) representing an address on the network NW at which a vacant time slot calendar 51 of another user (also referred to below as a "second user") is located from the user terminal 300 of the second user. The user terminal 300 of the first user accesses the vacant time slot calendar 51 of the second user based on the received character string and causes the display 300a to display the vacant time slot calendar 51 of the second user.

The user terminal 300 of the first user determines whether or not the first user inputs a comparison request by operating the input device 300b. Specifically, the user terminal 300 of the first user determines whether or not the button 55 of the vacant time slot calendar 51 of the second user is pushed. Upon determination that the comparison request is input, that is, when it is determined that the button 55 is pushed, the user terminal 300 of the first user transmits the comparison request to the vacant time slot managing device 1. The communication section 15 receives the comparison request and the interface section 13 receives the comparison request via the communication section 15. The vacant time slot comparing section 11 then performs comparison between the vacant time slots of the first user and those of the second user and generates comparison data. The vacant time slot comparing section 11 transmits the comparison data to the user terminal 300 of the first user via the communication section 15. The user terminal 300 of the first user receives the comparison data and causes the display 300a to display information represented by the comparison data. The comparison and the comparison data are the same as those described in (4-A) above. The comparison may be processing to update the vacant time slot calendar 51 of the second user by adding the vacant time slots in the vacant time slot calendar 51 of the first user to the vacant time slots in the vacant time slot calendar 51 of the second user.

(7) The vacant time slot managing device described with reference to FIG. 1 may further include a correlation section. The following describes the correlation section with reference to the vacant time slot comparing section 11.

The vacant time slot comparing section 11 performs comparison among vacant time slots of a plurality of users belonging to a specific group. The correlation section correlates information with vacant time slots based on a result of comparison by the vacant time slot comparing section 11 and generates correlation data. The correlation section transmits the correlation data to the user terminals 300 of the respective users belonging to the specific group via the communication section 15. The correlation data represents for example information correlated with the vacant time slots and the vacant time slots. Alternatively, the correlation data represents a character string representing an address on the network NW. The information correlated with the vacant time slots and the data representing the vacant time slots are located at the address on the network NW. In the above configuration, the users can browse and share the information correlated with the vacant time slots and the vacant time slots.

Specifically, the vacant time slot comparing section 11 performs comparison among the vacant time slots of the users belonging to the specific group and computes a time slot among the vacant time slots of the users that overlap with one another (also referred to below as an "overlap vacant time slot).

The correlation section correlates the information with the overlap vacant time slots and generates correlation data. The information includes for example information common to the users. The information common to the users includes for example a scheduled event (e.g., a meeting schedule) common to the users. The scheduled event includes for example schedule contents. The schedule event common to the users will be also referred to below as a "common scheduled event". Note that correlating the common scheduled event with the overlap vacant time slot means setting the common scheduled event in the overlap vacant time slot.

The correlation data represents for example the common scheduled event correlated with the overlap vacant time slots and the overlap vacant time slot. The correlation data represents for example a scheduled event list (e.g., a calenderer). The scheduled event list includes a region indicating the overlap vacant time slot and the common scheduled event set in a region indicating the overlap vacant time slot. The correlation data is transmitted to the user terminals 300. Accordingly, the users can browse and share the common scheduled event and the overlap vacant time slot. In particular, it is unnecessary for the users to search for the overlap vacant time slot, with a result that user convenience in deciding date and time on which a common scheduled event is to be set can be improved.

The correlation section may generate plural pieces of correlation data. The plural pieces of correlation data each include a scheduled event list. The scheduled event lists are assigned to the respective users belonging to the specific group. That is, a certain scheduled event list includes a scheduled event of a certain user. As such, the scheduled event lists each include a scheduled event, a region indicating an overlap vacant time slot, and a common scheduled event set in the region indicating the overlap vacant time slot. The correlation section transmits the plural pieces of correlation data to the respective user terminals 300. In the above configuration, the users can each browse the common scheduled event while comparing it with a scheduled event of user's own in the scheduled event list of user's own and share only the common scheduled event.

Note that the CPU 61 executes computer programs to function as the correlation section.

(8) The vacant time slot managing device 1 may be implemented by a single computer or a plurality of computers. Furthermore, in a configuration in which the vacant time slot managing device 1 is implemented by a plurality of computers, the respective computers may not be installed at the same place. It is only required that the computers are connected with one another via a network.

INDUSTRIAL APPLICABILITY

The present invention relates to a vacant time slot managing device, a vacant time slot managing method, a computer program, and a storage medium and has applicability.

REFERENCE SIGNS LIST

1 vacant time slot managing device
3 control section
5 schedule acquiring section
7 vacant time slot computing section
9 character string generating section 11 vacant time slot comparing section
13 interface section
15 communication section
17 storage
100 vacant time slot managing system
200 calendar server
300 user terminal
DB database
NW network

The invention claimed is:

1. A vacant time slot managing device comprising:
a processor;
a storage device; and
a communication device that is connected to a network and that communicates with a calendar server and a user terminal, the calendar server storing therein a plurality of scheduled event list data pieces of a plurality of users, the schedule event list data pieces each including time data, the time data representing a start time and an end time of a scheduled event of a user of the plurality of users, wherein
the processor functions as a schedule acquisition section, a vacant time slot computing section, a control section, and an address generation section through execution of a computer program stored in the storage device,
the schedule acquisition section acquires the time data on a user by user basis via the network and the communication device from the calendar server,
the vacant time slot computing section computes a vacant time slot of each of the plurality of users based on the time data,
the control section causes the storage device to store on a user by user basis vacant time slot data representing the vacant time slot computed by the vacant time slot computing section to constitute a database by the vacant time slot data in the storage device,
the vacant time slot computing section reads out the vacant time slot data from the storage and generates a vacant time slot calendar,
the vacant time slot calendar is a calendar including time, day, month, and year,
a region of the vacant time slot in the vacant time slot calendar is colored in a specific color,
the communication device transmits display data indicating the vacant time slot calendar to the user terminal,
the vacant time slot calendar is displayed on the user terminal based on the display data, serves as an interface when the user terminal accesses the vacant time slot managing device, and includes, in a state of being displayed on the user terminal, a clickable region and an operation image, the operation image being for performing a request for vacant time slot disclosure,
the communication device receives the request transmitted from the user terminal through operation on the operation image,
the address generation section generates in response to the request an address on the network on which the vacant time slot calendar is put,
the communication device transmits the address to the user terminal,
the vacant time slot calendar, in which no schedule events of the users is included, is accessed based on the address by a terminal of a third person which has received the address from the user terminal, and is displayed on the terminal of the third person, and
the database correlates the vacant time slot of each of the users with skill and labor cost, and adds an added value to the vacant time slot of each of the users to increase a utility value of each of the vacant time slots and support utilization of the vacant time slot of each of the users.

2. The vacant time slot managing device according to claim 1, wherein
the vacant time slot computing section computes the vacant time slot such that the vacant time slot does not include at least one of a period from a time point a first specific period before the start time of the scheduled event to the start time and a period from the end time of the scheduled event to a time point a second specific period after the end time.

3. The vacant time slot managing device according to claim 1, wherein
the vacant time slot computing section computes the vacant time slot such that the vacant time slot is longer than a third specific period.

4. The vacant time slot managing device according to claim 1, wherein
the processor performs comparison among vacant time slots of the respective users.

5. The vacant time slot managing device according to claim 1, wherein
the vacant time slot managing device transmits to the user terminal information in correlation with the vacant time slot, the information indicating a candidate for a scheduled event to be input to the vacant time slot.

6. The vacant time slot managing device according to claim 5, wherein
the information indicating the candidate indicates information for user recommendation.

7. The vacant time slot managing device according to claim 5, wherein
the information indicating the candidate is amusement information, hobby information, shop information, meal information, or self-development information.

8. The vacant time slot managing device according to claim 1, wherein
the vacant time slot managing device receives from a user terminal of a user among the plurality of users a communication address included in a contact address selected from a contact address table indicating contact addresses of a plurality of registered persons,
the control section
searches for a communication address matching with the received communication address from the database, and
acquires from the database vacant time slot data of another user among the plurality of users that is correlated with the searched communication address, and
the processor generates a character string for disclosing a vacant time slot represented by the vacant time slot data of the other user.

9. The vacant time slot managing device according to claim 1, wherein
the vacant time slot managing device receives a communication address included in a contact address selected from a contact address table indicating contact addresses of a plurality of registered persons from a server that discloses a website providing a social networking service,
the control section
searches for a communication address matching with the received communication address from the database, and acquires vacant time slot data of a user among the plurality of users that is correlated with the searched communication address from the database, and the processor generates a character string for disclosing a vacant time slot represented by the vacant time slot data of the user.

10. The vacant time slot managing device according to claim 1, further comprising an interface section configured to receive from the user terminal via the communication device vacant time slot data that represents a vacant time slot and that is input to the user terminal by the user, wherein the control section updates the database of the storage device based on the vacant time slot received by the interface section.

11. The vacant time slot managing device according to claim 1, wherein the processor superimposes vacant time slot calendars of two or more users of the plurality of users, the two or more users belonging to a specific group.

12. The vacant time slot managing device according to claim 1, wherein the address is a URL, and the display data is HTML data.

13. The vacant time slot managing device according to claim 1, wherein the processor generates a character string indicating the vacant time slot included in the vacant time slot calendar in response to the request, and the character string includes a time that is none of the user is occupied.

14. The vacant time slot managing device according to claim 1, wherein the processor generates a character string indicating one of the vacant time slots corresponding to a region of the vacant time slot calendar clicked in a state in which the vacant time slot calendar is displayed on the user terminal, and the character string includes a time that is none of the user is occupied.

15. The vacant time slot managing device according to claim 1, wherein in a state in which the vacant time slot calendar is displayed on the user terminal, the processor differentiates in color a clicked region from a non-clicked region among regions indicating the respective vacant time slots in the vacant time slot calendar.

16. The vacant time slot managing device according to claim 1, wherein the processor causes the user terminal to display the vacant time slot calendar in which a vacant time slot of another user is superimposed on the vacant time slot of the user of the user terminal.

17. The vacant time slot managing device according to claim 1, wherein the communication device transmits to the user terminal display data of a condition setting screen through which a vacant time slot setting acceptable range is input, the vacant time slot setting acceptable range is a range on a time axis within which storage of a time slot in the storage device as the vacant time slot is acceptable, the condition setting screen includes an input area through which the user is allowed to input a start time and an end time of the vacant time slot setting acceptable range, the communication device receives from the user terminal data indicating the vacant time slot seeing acceptable range input through the input area of the condition setting screen, and the vacant time computing section computes the vacant time slot based on the time data within the vacant time slot setting acceptable range.

18. The vacant time slot managing device according to claim 17, wherein the communication device receives data indicating the vacant time slot setting acceptable range from the user terminal that displays the vacant time slot calendar, and the control section updates the vacant time slot data stored in the database based on the data indicating change of contents of the vacant time slot.

19. A vacant time slot managing method implemented by a vacant time slot managing device, the vacant time slot managing device including a processor, a storage device, and a communication device that is connected to a network and that communicates with a calendar server and a user terminal, the calendar server storing therein a plurality of scheduled event list data pieces of a plurality of users, the scheduled event list data pieces each including time data, the time data representing a start time and an end time of a scheduled event of a user of the plurality of user, the vacant time slot managing method comprising causing the processor to:

acquire the time data on a user by user basis via the network and the communication device from the calendar server;

compute a vacant time slot of each of the plurality of users based on the time data;

store to the storage device vacant time slot data representing the computed vacant time slot on a user by user basis to constitute a database by the vacant time slot data in the storage device; and read out the vacant time slot data from the storage device to generate a vacant time slot calendar, wherein the vacant time slot calendar is a calendar including time, day, month, and year, a region of the vacant time slot in the vacant time slot calendar is colored in a specific color, the communication device transmits display data indicating the vacant time slot calendar to the user terminal, the vacant time slot calendar is displayed on the user terminal based on the display data, serves as an interface when the user terminal accesses the vacant time slot managing device, and includes, in a state of being displayed on the user terminal, a clickable region and an operation image, the operation image being for performing a request for vacant time slot disclosure, the communication device receives the request transmitted from the user terminal through operation on the operation image, the address generation section generates in response to the request an address on the network on which the vacant time slot calendar is put, the communication device transmits the address to the user terminal, the vacant time slot calendar, in which no schedule events of the users is included, is accessed based on the address by a terminal of a third person which has received the address from the user terminal, and is displayed on the terminal of the third person, and the database correlates the vacant time slot of each of the users with skill and labor cost, and adds an added value to the vacant time slot to increase a utility value of each of the vacant time slots and support utilization of the vacant time slot of each of the users.

20. A vacant time slot managing system comprising:
a calendar server that stores therein a plurality of scheduled event list data pieces of a plurality of users; and
a vacant time slot managing device, wherein
the scheduled event list data pieces each includes time data representing a start time and an end time of a schedule event of a user of the plurality of users,
the vacant time slot managing device includes:
 a processor;
 a storage device; and
 a communication device that is connected to a network and that communicates with the calendar server and a user terminal,
the processor functions as a schedule event acquiring section, a vacant time slot computing section, a control section, and an address generation section through execution of a computer program stored in the storage device,
the schedule event acquiring section acquires the time data on a user by user basis from the calendar server via the network and the communication device,
the vacant time slot computing section configured to compute computes the vacant time slot of each of the plurality of users based on the time data,
the control section configured to cause the storage device to store vacant time slot data representing the vacant time slot computed by the vacant time slot computing section on a user by user basis to constitute a database by the vacant time slot data in the storage device,
the vacant time slot computing section reads out the vacant time slot data from the storage and generates a vacant time slot calendar,
the vacant time slot calendar is a calendar including time, day, month, and year,
a region of the vacant time slot in the vacant time slot calendar is colored in a specific color,
the communication device transmits display data indicating the vacant time slot calendar to the user terminal,
the vacant time slot calendar is displayed on the user terminal based on the display data, serves as an interface when the user terminal accesses the vacant time slot managing device, and includes, in a state of being displayed on the user terminal, a clickable region and an operation image, the operation image being for performing a request for vacant time slot disclosure,
the communication device receives the request transmitted from the user terminal through operation on the operation image,
the address generation section generates in response to the request an address on the network on which the vacant time slot calendar is put,
the communication device transmits the address to the user terminal,
the vacant time slot calendar, in which no schedule events of the users is included, is accessed based on the address by a terminal of a third person which has received the address from the user terminal, and is displayed on the terminal of the third person, and
the database correlates the vacant time slot of each of the users with skill and labor cost, and adds an added value to the vacant time slot to increase a utility value of each of the vacant time slots and support utilization of the vacant time slot of each of the users.

* * * * *